(12) United States Patent
Kim et al.

(10) Patent No.: US 11,492,750 B2
(45) Date of Patent: Nov. 8, 2022

(54) CLOTHES CARE APPARATUS AND CONTROL METHOD THEREOF

(71) Applicant: Samsung Electronics Co., Ltd., Suwon-si (KR)

(72) Inventors: Juyoung Kim, Suwon-si (KR); Kookjeong Seo, Suwon-si (KR); Jewoo Bang, Suwon-si (KR); Dohaeng Kim, Suwon-si (KR); Dongsuk Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 16/947,114

(22) Filed: Jul. 17, 2020

(65) Prior Publication Data
US 2021/0017699 A1    Jan. 21, 2021

(30) Foreign Application Priority Data
Jul. 17, 2019 (KR) .......... 10-2019-0086561

(51) Int. Cl.
*F26B 21/06* (2006.01)
*D06F 58/38* (2020.01)
(Continued)

(52) U.S. Cl.
CPC .......... *D06F 58/38* (2020.02); *D06F 34/26* (2020.02); *D06F 58/206* (2013.01); *D06F 58/30* (2020.02);
(Continued)

(58) Field of Classification Search
CPC .......... D06F 58/32; D06F 58/34; D06F 58/36; D06F 58/40; D06F 58/42; D06F 58/38;
(Continued)

(56) References Cited

U.S. PATENT DOCUMENTS 9,745,690 B2    8/2017 Lee et al.
10,100,460 B2 * 10/2018 Bisaro ............... D06F 58/34
(Continued)

FOREIGN PATENT DOCUMENTS

JP    2008104625 A    5/2008
KR    20050050301    * 11/2005 ......... D06F 58/36
(Continued)

OTHER PUBLICATIONS

International Search Report dated Nov. 13, 2020 in connection with International Patent Application No. PCT/KR2020/009161, 2 pages.
(Continued)

*Primary Examiner* — John P McCormack

(57) ABSTRACT

A clothes care apparatus includes a chamber, a first damper, a second damper, a heat exchanger, at least one blower fan, a sensor portion, and a controller. The first damper is configured to control an airflow from inside the chamber to outside the chamber. The second damper is configured to control the airflow into the chamber from the outside. The heat exchanger is provided with a compressor and configured to exchange heat with air in the chamber. The at least one blower fan is configured to generate the airflow. The sensor portion is configured to obtain a temperature and humidity inside and outside of the chamber. The controller is configured to start a drying cycle, control the first and second damper to be opened or closed, and control the heat exchanger and the at least one blower fan by comparing the internal humidity with the external humidity.

24 Claims, 17 Drawing Sheets

(51) Int. Cl.
*D06F 58/30* (2020.01)
*D06F 58/20* (2006.01)
*D06F 34/26* (2020.01)
*D06F 105/32* (2020.01)
*D06F 103/34* (2020.01)
*D06F 105/26* (2020.01)
*D06F 105/30* (2020.01)
*D06F 103/32* (2020.01)

(52) U.S. Cl.
CPC ...... *D06F 2103/32* (2020.02); *D06F 2103/34* (2020.02); *D06F 2105/26* (2020.02); *D06F 2105/30* (2020.02); *D06F 2105/32* (2020.02)

(58) Field of Classification Search
CPC ........ D06F 58/206; D06F 58/30; D06F 58/10; D06F 34/26; D06F 2103/32; D06F 2103/34; D06F 2103/00; D06F 2105/26; D06F 2105/30; D06F 2105/32; Y02B 40/00
USPC .......................................................... 34/535
See application file for complete search history.

(56) References Cited

U.S. PATENT DOCUMENTS

| | | | |
|---|---|---|---|
| 2009/0094852 A1* | 4/2009 | Tatsumi | D06F 58/206 34/132 |
| 2012/0096736 A1* | 4/2012 | Bellinger | D06F 58/46 34/427 |
| 2017/0241067 A1 | 8/2017 | Bing et al. | |

FOREIGN PATENT DOCUMENTS

| | | | | |
|---|---|---|---|---|
| KR | 10-2006-0010441 B1 | 2/2006 | | |
| KR | 10-0782377 B1 | 12/2007 | | |
| KR | 10-2012-0077194 A | 7/2012 | | |
| KR | 10-1613965 B1 | 4/2016 | | |
| KR | 10-2019-0000146 A | 1/2019 | | |
| KR | 20190000146 A | * | 1/2019 | ............ D06F 58/28 |
| KR | 20190081706 A | 7/2019 | | |

OTHER PUBLICATIONS

European Patent Office, "Supplementary European Search Report," dated Jun. 3, 2022, in connection with European Patent Application No. 20839871.9, 7 pages.

* cited by examiner

CLOTHES CARE APPARATUS AND CONTROL METHOD THEREOF

CROSS-REFERENCE TO RELATED APPLICATION

This application is based on and claims priority under 35 U.S.C. § 119 to Korean Patent Application No. 10-2019-0086561, filed on Jul. 17, 2019, in the Korean Intellectual Property Office, the disclosure of which is incorporated by reference herein in its entirety

BACKGROUND

1. Field

The disclosure relates to a clothes care apparatus capable of performing a drying cycle of clothes, removing wrinkles from the clothes and capable of removing dust attached to clothes or smell of the clothes.

2. Description of Related Art

A clothes care apparatus is a type of device performing clothes care such as drying wet clothes, removing dust attached to the clothes or eliminating remaining odors in the clothes and removing wrinkles from the clothes.

In addition, the clothes care apparatus has a vapor compression heat pump system and is capable of drying object through the air circulation.

Meanwhile, in the drying cycle of the conventional clothes care apparatus, the operation of the heat pump is performed until the end of drying is identified. This method may be effective when an object to be dried has a large amount of moisture. However, at a time in which the amount of moisture is reduced due to the proceeding of the drying cycle, this method may have the poor drying efficiency with respect to the power consumption.

Therefore, there is a need for a technique for performing a smooth drying cycle with efficient power consumption.

SUMMARY

Therefore, it is an aspect of the disclosure to provide a clothes care apparatus capable of efficiently managing power by drying an object to be dried using the outside air and controlling a heat exchanger, and a control method thereof.

Additional aspects of the disclosure will be set forth in part in the description which follows and, in part, will be obvious from the description, or may be learned by practice of the disclosure.

In accordance with an aspect of the disclosure, a clothes care apparatus includes a chamber, a first damper configured to control an air flow from the chamber to the outside, a second damper configured to control an air flow from the outside to the chamber, a heat exchanger provided with a compressor and configured to exchange heat with air in the chamber, at least one blower fan configured to generate the air flow, a sensor portion configured to obtain a temperature and humidity of the inside and the outside of the chamber, and a controller configured to start a drying cycle by using the inside air through the heat exchanger, and configured to allow the first damper and the second damper to be opened or closed and configured to control driving of the heat exchanger and the at least one blower fan by comparing the internal humidity with the external humidity when the temperature and the humidity of the inside of the chamber meets a predetermined condition.

When the drying cycle starts, the controller may close the first damper and the second damper, and perform driving of the blower fan and the heat exchanger, and when the internal humidity of the chamber is less than a reference humidity and the internal temperature of the chamber is higher than or equal to a reference temperature, the controller may determine that the predetermined condition is satisfied.

When an external absolute humidity is less than an internal absolute humidity, the controller may stop driving of the compressor, opens the first damper and the second damper, and start to drive the blower fan so as to generate the air flow in which air flows from the second damper to the first damper through the chamber.

The blower fan may include a first blower fan configured to generate the air flow from the chamber to the outside, and the controller may directly introduce the outside air to the chamber by driving the first blower fan.

When the external humidity exceeds the internal humidity, the controller may drive the compressor, open the first damper and the second damper, and drive the blower fan so as to generate the air flow in which air flows from the second damper to the chamber through the heat exchanger.

The blower fan may include a second blower fan configured to generate the air flow from the outside to the heat exchanger.

The controller may allow the compressor to drive at a predetermined frequency, such as a minimum frequency.

The minimum frequency may correspond to a frequency that is applied to consume power less than power that is consumed by the compressor before the predetermined condition is satisfied.

When the external humidity exceeds a predetermined value, the controller may close the first damper and the second damper and drive the blower fan and the compressor.

The sensor portion may be provided inside the chamber, and the controller may open the first damper and the second damper at a start timing of the drying cycle and determine the external absolute humidity based on a temperature and humidity of the inside of the clothe care apparatus.

The sensor portion may include an internal sensor provided in the inside of the clothes care apparatus and an external sensor provided on the outside of the clothes care apparatus, and the controller may determine the internal absolute humidity based on a temperature and humidity obtained by the internal sensor, and the controller may determine the external absolute humidity based on a temperature and humidity obtained by the external sensor.

The internal humidity may correspond to the absolute humidity of the inside of the chamber, and the external humidity may correspond to the absolute humidity of the outside of the clothes care apparatus.

In accordance with another aspect of the disclosure, a control method of a clothes care apparatus includes obtaining a temperature and humidity of the inside and the outside of a chamber, performing a drying cycle by using inside air through a heat exchanger provide with a compressor, and allowing a first damper and a second damper to be opened or closed and controlling driving of the heat exchanger and at least one blower fan by comparing the internal humidity with the external humidity when the temperature and the humidity of the inside of the chamber meets a predetermined condition.

Performing a drying cycle by using inside air through a heat exchanger may include closing the first damper and the second damper, and performing driving of the blower fan and the heat exchanger, and when the internal humidity of the chamber is less than a reference humidity and the internal temperature of the chamber is higher than or equal to a reference temperature, determining that the predetermined condition is satisfied.

Allowing a first damper and a second damper to be opened or closed and strolling driving of the heat exchanger and at least one blower fan by comparing the internal humidity with the external humidity may include when an external absolute humidity is less than an internal absolute humidity, stopping driving of the compressor, opening the first damper and the second damper, and starting to drive the blower fan, thereby generating an air flow in which air flows from the second damper to the first damper through the chamber.

The blower fan may include a first blower fan configured to generate the air flow from the chamber to the outside, and controlling at least one blower fan may include directly introducing the outside air to the chamber by driving the first blower fan.

Allowing a first damper and a second damper to be opened or closed and controlling driving of the heat exchanger and at least one blower fan by comparing the internal humidity with the external humidity may include, when the external humidity exceeds the internal humidity, driving the compressor, opening the first damper and the second damper, and driving the blower fan, thereby generating an air flow in which air flows from the second damper to the chamber through the heat exchanger.

The blower fan may include a second blower fan configured to generate the air flow from the outside to the heat exchanger.

Controlling the compressor may include allowing the compressor to drive at a predetermined frequency such as a minimum frequency.

The minimum frequency may correspond to a frequency that is applied to consume the power less than the power that is consumed by the compressor before the predetermined condition is satisfied.

Allowing a first damper and a second damper to be opened or closed and controlling driving of the heat exchanger and at least one blower fan by comparing the internal humidity with the external humidity may include, when the external humidity exceeds a predetermined value, closing the first damper and the second damper and driving the blower fan and the compressor.

Obtaining a temperature and humidity of the inside and the outside of a chamber may include opening the first damper and the second damper at a start timing of the drying cycle, and determining the external absolute humidity based on a temperature and humidity of the inside of the clothe care apparatus.

Obtaining a temperature and humidity of the inside and the outside of a chamber may include determining the internal absolute humidity based on a temperature and humidity obtained by an internal sensor, and determining the external absolute humidity based on a temperature and humidity obtained by an external sensor.

The internal humidity may correspond to the absolute humidity of the inside of the chamber, and the external humidity may correspond to the absolute humidity of the outside of the clothes care apparatus.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
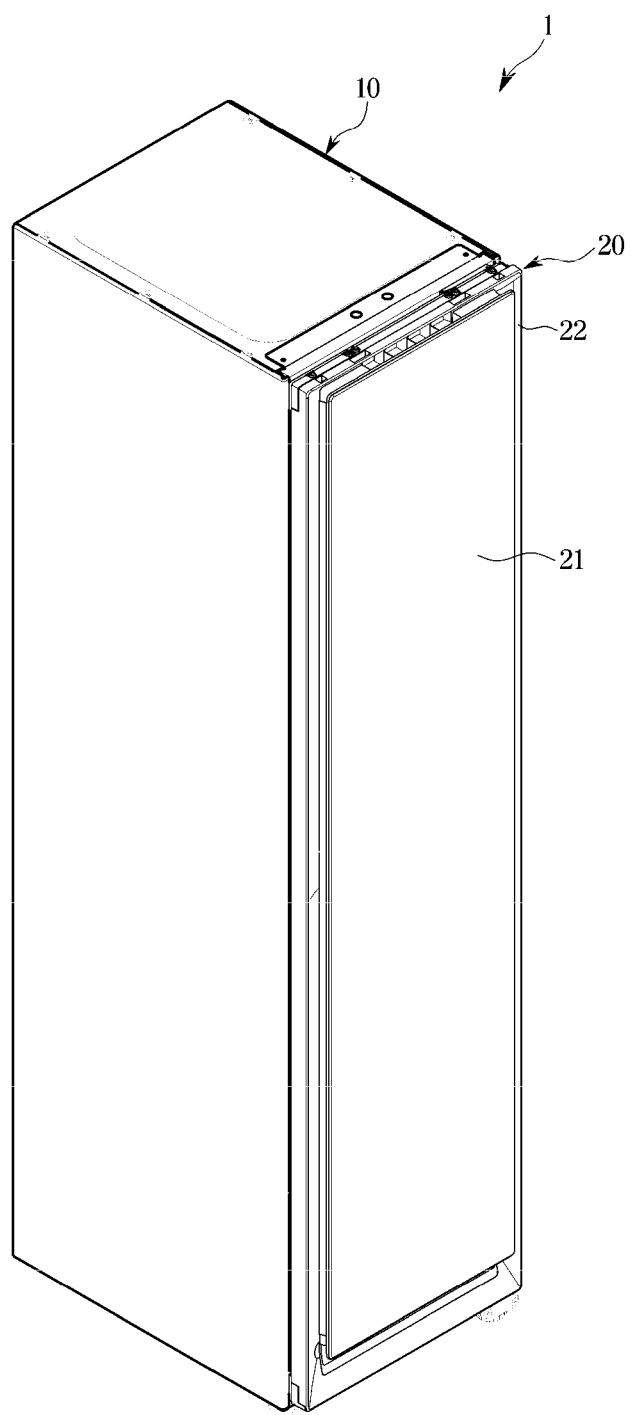
FIG. 1 illustrates a view of a clothes care apparatus according to an embodiment of the disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the following description, like reference numerals refer to like elements throughout the specification. Well-known functions or constructions are not described in detail since they would obscure the one or more exemplar embodiments with unnecessary detail.

Terms such as "unit", "portion", "block", "member" and "module" may be embodied as hardware or software. In addition, "unit", "portion", "block", "member" and "module" may indicate a unit for processing at least one function or operation. In addition, terms such as "unit", "portion", "block", "member" and "module" may refer to at least one process processed by at least one software or process stored in at least one hardware, circuit, and a memory. According to embodiments, "unit", "portion", "block", "member" and "module" may include at least one component.

It will be understood that when an element is referred to as being "connected" another element, it can be directly or indirectly connected to the other element, wherein the indirect connection includes "connection via a wireless communication network". Also, when a part "includes" or "comprises" an element, unless there is a particular description contrary thereto, the part may further include other elements, not excluding the other elements.

It will be understood that, although the terms first, second, third, etc., may be used herein to describe various elements, but is should not be limited by these terms. These terms are only used to distinguish one element from another element. As used herein, the singular forms "a," "an" and "the" are intended to include the plural forms as well, unless the context clearly indicates otherwise.

An identification code is used for the convenience of the description but is not intended to illustrate the order of each step. Each step may be implemented in the order different from the illustrated order unless the context clearly indicates otherwise.

The disclosure will be described more fully hereinafter with reference to the accompanying drawings.

Figure 2:
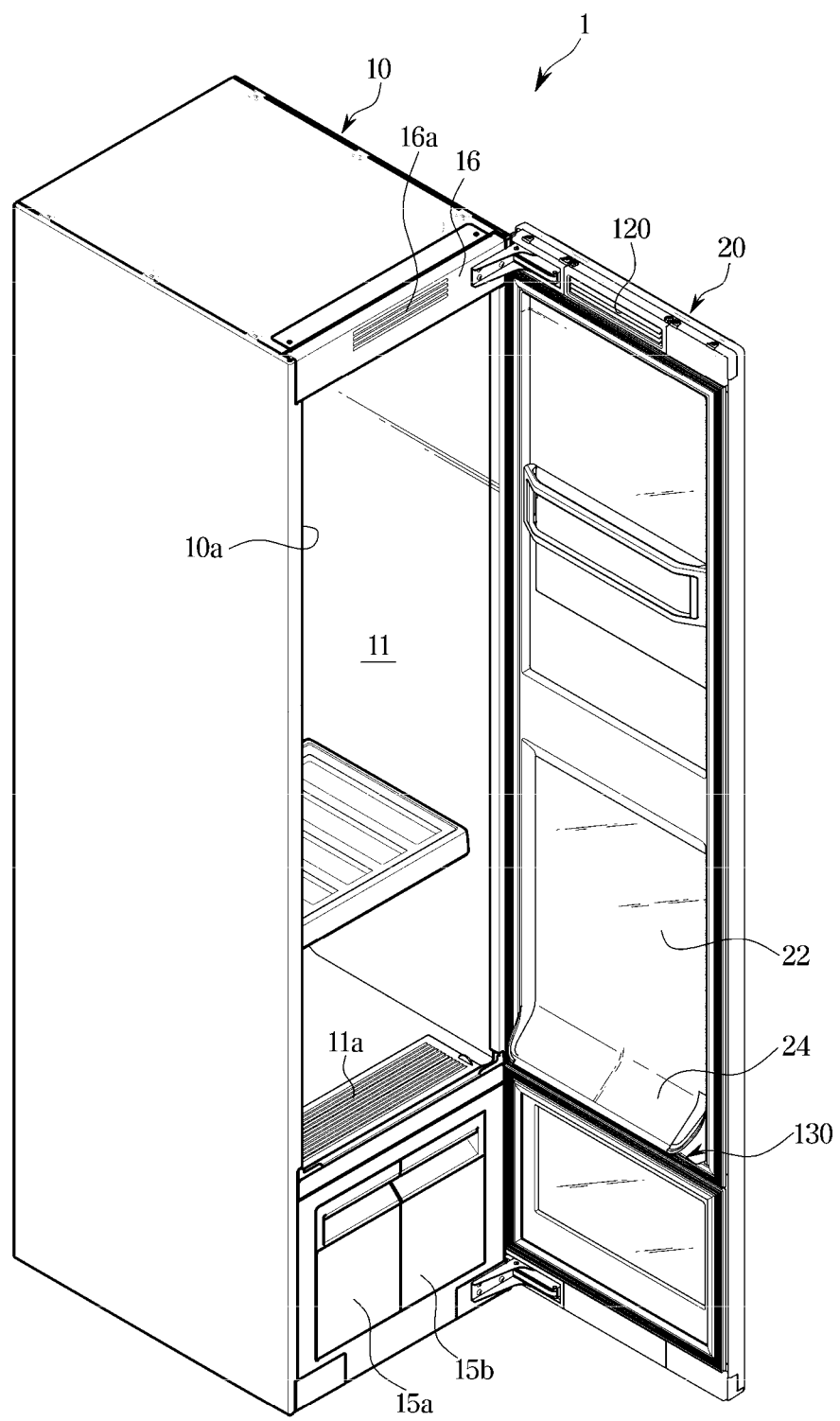
FIG. 2 is a view illustrating a state in which a door of the clothes care apparatus according to an embodiment of the disclosure is opened.
Figure 3:
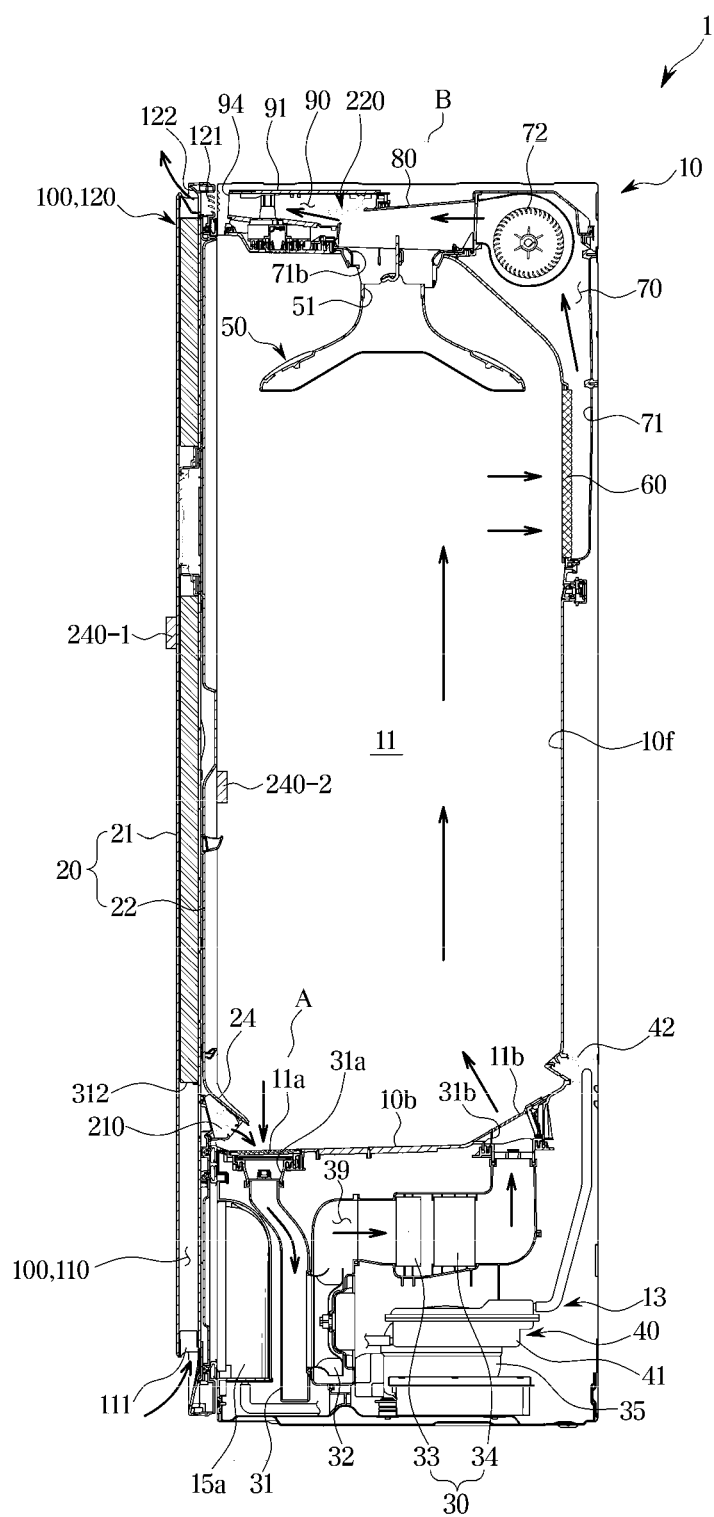
FIG. 3 illustrates a side cross-sectional view of the clothes care apparatus according to an embodiment of the disclosure.
Figure 4:
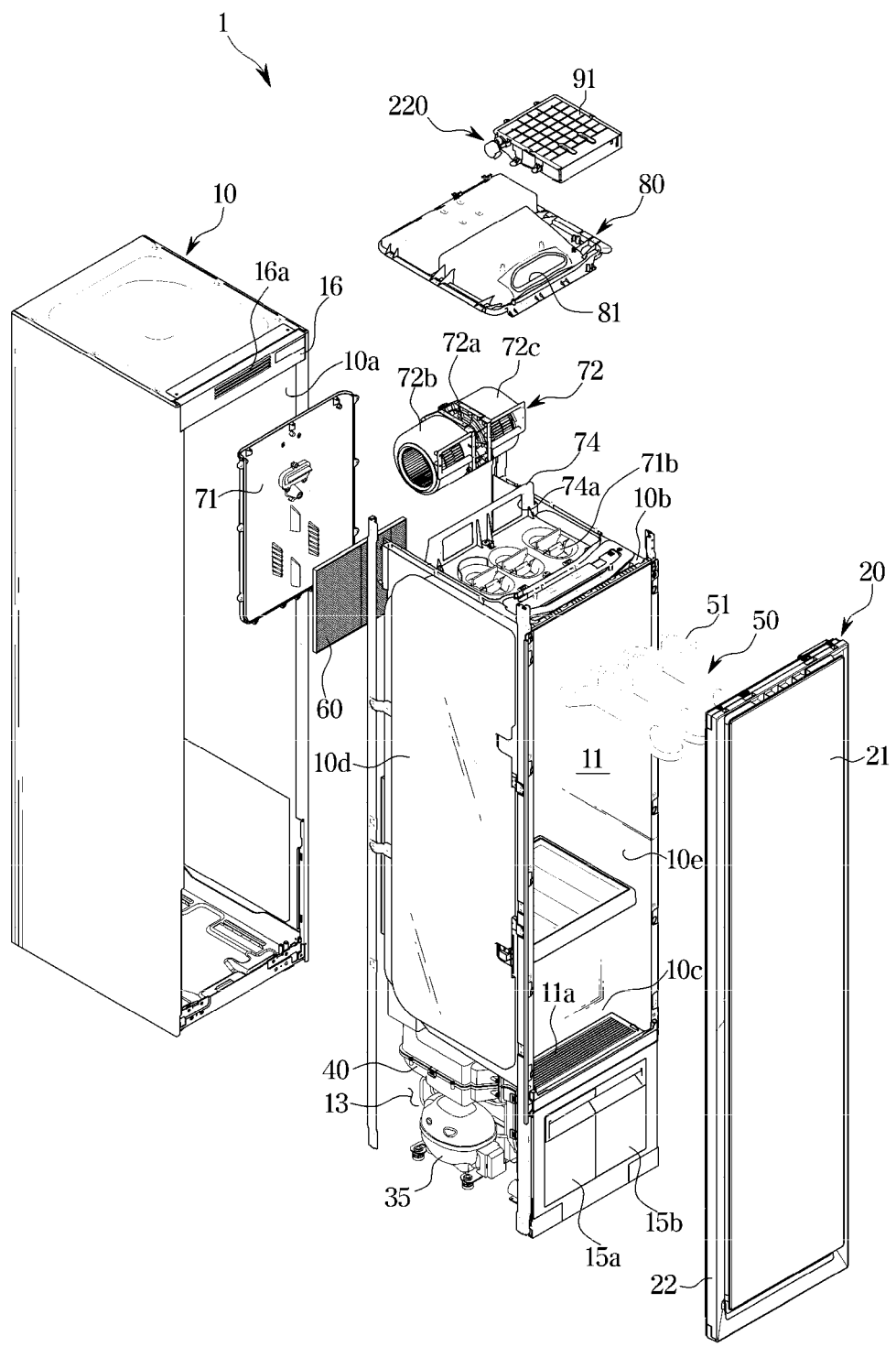
FIG. 4 is an exploded view illustrating the clothes care apparatus according to an embodiment of the disclosure.

FIG. 1 illustrates a view of a clothes care apparatus according to an embodiment of the disclosure, FIG. 2 is a view illustrating a state in which a door of the clothes care apparatus according to an embodiment of the disclosure is opened, FIG. 3 illustrates a side cross-sectional view of the clothes care apparatus according to an embodiment of the disclosure, and FIG. 4 is an exploded view illustrating the clothes care apparatus according to an embodiment of the disclosure.

As illustrated in FIGS. 1 to 4, a clothes care apparatus 1 may include a body 10 forming an external appearance, a door 20 rotatably coupled to body 10, a chamber 11 provided inside the body 10 to allow clothes to be placed and to be managed, a clothes support member 50 provided inside the chamber 11 to allow clothes to be hung thereon, and a machine room 13 provided with a heat exchanger 30 configured to dehumidify or heat air in the chamber 11.

The body 10 may have the chamber 11 formed therein, and may have a hexahedron shape having an open one surface. An opening 10a may be formed on the front surface of the body 10. The door 20 is rotatably coupled to the opening 10a of the body 10 to open and close the chamber 11. Although not shown, the door 20 may be installed through a connecting member such as a hinge and a link.

The chamber 11 forms a space in which clothes are accommodated. The chamber 11 may be formed by including an upper surface 10b, a lower surface 10c, a left side surface 10d, a right side surface 10e, and a rear surface 10f provided inside the body 10. The front surface of the chamber 11 is formed to be open. Therefore, the opening of the chamber 11 may also be opened and closed by the door 20 configured to open and close the opening 10a of the body 10.

A discharge bracket 16 installed in a position corresponding to a discharge flow path 120 of the door 20 described later may be provided on an upper end of the opening 10a of the body 10. The discharge bracket 16 may include a plurality of slits 16a arranged in accordance with the discharge flow path 120 of the door 20.

The clothes support member 50 configured to allow clothes to be hung and to be supported, is provided in the chamber 11. The clothes support member 50 may be installed on the upper surface 10b of the chamber 11. The clothes support member 50 may be removably installed in the chamber 11. One or more clothes support member 50 may be provided. The clothes support member 50 may be formed in a clothes hanger shape to allow clothes to be hung.

The clothes support member 50 is configured to allow air to flow therein. Dust or foreign substances on the clothes may be removed by the air supplied into the clothes support member 50. The clothes support member 50 may be provided with an air hole 51 for supplying air to the clothes. According to an embodiment, it is assumed that the air hole is arranged on an upper end of the clothes support member 50, and the air discharged through the air hole is supplied to the inside and the outside of the clothes, but is not limited thereto. For example, the air hole may be formed in various sizes at various positions to inject air into the clothes in various directions.

The chamber 11 may include a first airflow inlet 11a, a second airflow inlet 12a, a first airflow outlet 11b, a second airflow outlet 12b and a steam outlet 43. The first airflow inlet 11a and the first airflow outlet 11b may be formed on the lower surface 10c of the chamber 11. The first airflow inlet 11a may be arranged in a front portion of the lower surface 10c of the chamber 11. The first airflow outlet 11b may be arranged in a rear portion of the lower surface 10c of the chamber 11.

The first airflow inlet 11a and the first airflow outlet 11b may be arranged adjacent to each other.

The steam outlet 43 may be arranged in a lower portion of the rear surface 10f of the chamber 11. The steam outlet 43 may be arranged in an upper side of the first airflow outlet 11b.

The second airflow inlet 12a may be formed at an upper portion of the rear surface 10f of the chamber 11. The second airflow outlet 12b may be formed at a substantially central portion of the upper surface 10b of the chamber 11. The second airflow inlet 12a and the second airflow outlet 12b may be arranged adjacent to each other.

The second airflow outlet 12b of the chamber 11 may be connected to the clothes support member 50. Air discharged through the second airflow outlet 12b may be delivered to the clothes support member 50 through the air hole 51 and then delivered to the clothes hung on the clothes support member 50.

In the lower portion of the body 10, a water drain tank 15a and a water supply tank 15b removably installed to the body 10 may be provided. The water drain tank 15a and the water supply tank 15b may be arranged under the chamber 11. The water drain tank 15a may be configured to easily treat condensed water. The water supply tank 15b may store water needed for a steam generation device 40 to generate steam described later. That is, water of the water supply tank 15b is supplied to the steam generation device 40 and then used to generate steam. The water supply tank 15b may be removably mounted to the body 10 so as to easily supplement water.

The water drain tank 15a and the water supply tank 15b may be provided in front of the machine room 13. The machine room 13 is provided in the lower portion of the body 10. The machine room 13 is provided under the chamber 11. The machine room 13 may include the heat exchanger 30 configured to dehumidify and heat air in the chamber 11 as needed.

A second blower fan 32, the heat exchanger 30, and the steam generation device 40 may be arranged inside the machine room 13.

The heat exchanger 30 is installed to supply hot air into the chamber 11. The heat exchanger 30 includes an evaporator 33, a compressor 35 and a condenser 34 through which a refrigerant circulates, and the heat exchanger 30 is configured to dehumidify and heat the air.

As the refrigerant evaporates in the evaporator 33 of the heat exchanger 30, the refrigerant absorbs latent heat of the ambient air so as to condense and remove moisture in the air. In addition, when the refrigerant is passed through the compressor 35 and then condensed in the condenser 34, the latent heat is released toward the ambient air to heat the ambient air.

That is, the evaporator 33 and the condenser 34 function as heat exchangers, and the air, which flows into the machine room 13 by the second blower fan 32, is dehumidified and heated while passing through the evaporator 33 and the condenser 34 sequentially.

The heat exchanger 30 installed in the machine room 13 may include a first duct 31 configured to connect the evaporator 33, the condenser 34 and the second blower fan 32, and the first duct 31 may be connected to the chamber 11, thereby forming a first circulation flow path 39 circulating between the chamber 11 and the first duct 31.

The first duct 31 may be connected to the first airflow inlet 11a and the first airflow outlet 11b of the chamber 11. One end of the first duct 31 may be connected to the first airflow inlet 11a of the chamber 11, and the other end of the first duct 31 may be connected to the first airflow outlet 11b of the chamber 11. A first duct inlet 31a of the first duct 31 may be connected to the first airflow inlet 11a and a first duct outlet 31b may be connected to the first airflow outlet 11b.

Air in the chamber 11 may flow into the first duct 31 through the first airflow inlet 11a. The flowing air may be dehumidified and then discharged to the chamber 11 again, through the first airflow outlet 11b. According to an embodiment, it is assumed that the first airflow inlet is arranged in the front portion of the chamber and the first airflow outlet is arranged in the rear portion of the chamber, but is not limited thereto. Therefore, a location of the airflow inlet and airflow outlet may vary, as needed.

The first duct 31 is configured to dehumidify the air flowing through the first airflow inlet 11a, and to discharge the dehumidified air to the first airflow outlet 11b. The second blower fan 32 is installed on the first duct 31 to suck the air of the chamber 11 into the first duct 31.

The machine room 13 may further include the steam generation device 40 configured to generate steam by receiving water from the water supply tank 15b. The steam generation device 40 may be arranged in the machine room 13. The steam generation device 40 may include a steam generator 41 connected to the water supply tank 15b to receive the water so as to generate steam, and a steam supply pipe 44 configured to guide the generated steam to a steam injector 42. The steam injector 42 may be arranged in a lower portion of the rear surface of the chamber 11.

A heater (not shown) may be installed inside the steam generator 41 to heat water.

The chamber 11 may include a first blower fan 72 configured to move the air in the chamber 11.

The chamber 11 may include a second duct 71, and the first blower fan 72 may be installed in the second duct 71. The second duct 71 may communicates with the chamber 11, and accordingly, a second circulation flow path 70 configure to allow air to circulate between the chamber 11 and the second duct 71 may be formed. The first blower fan 72 may be arranged on the second circulation flow path 70.

The second duct 71 may be formed behind the second airflow inlet 12a of the chamber 11. The second duct 71 may be provided at the upper rear of the chamber 11, and may include a filter member 60 therein. The second duct 71 may be coupled to a top cover 80 arranged above the chamber 11. The second duct 71 may be coupled to the top cover 80 and the first blower fan 72 may be installed therein. The first blower fan 72 may be arranged at the upper rear of the chamber 11. The first blower fan 72 may include a blower motor 72a configured to generate a rotational force, and at least one fan 72b configured to rotate by the blower motor. The fan 72b may be accommodated by a fan case 72c. The fan case 72c may be coupled to a duct bracket 74 provided on the upper surface 10b of the chamber 11. At least one duct hole 74a is formed in the duct bracket 74, and the first blower fan 72 is coupled to the at least one duct hole 74a to supply air of the second duct 71 to the second airflow outlet 12b of the second duct 71.

The second duct 71 may be connected to the second airflow inlet 12a and the second airflow outlet 12b of the chamber 11. One end of the second duct 71 may be connected to the second airflow inlet 12a of the chamber 11, and the other end of the second duct 71 may be connected to the second airflow outlet 12b. A second duct inlet 71a of the second duct 71 may be connected to the second airflow inlet 12a and a second duct outlet 71b may be connected to the second airflow outlet 12b.

The second airflow outlet 12b of the chamber 11 may be formed on a position corresponding to the second duct outlet 71b of the second duct 71.

The second duct outlet 71b of the second duct 71 may be connected to the second airflow outlet 12b of the chamber 11, and the second airflow outlet 12b of the chamber 11 may be connected to the clothes support member 50. Therefore, the air of the second duct 71 may be delivered to the clothes support member 50.

The first blower fan 72 arranged in the second duct 71 sucks air in the chamber 11 through the second airflow inlet 12a and discharges the air to the second duct outlet 71b and the second airflow outlet 12b.

The filter member 60 is installed in the second airflow inlet 12a of the chamber 11. The second airflow inlet 12a is formed on the rear surface 10f of the chamber 11. A filter member mounting portion 11c in which the filter member 60 installed is formed on the rear surface 10f of the chamber 11. The second airflow inlet 12a may be formed at a position corresponding to the filter member mounting portion 11c.

When air of the chamber 11 flows into the second duct 71, the air may be filtered by the filter member 60 of the second airflow inlet 12a. Dust and odor in the air flowing into the second duct 71 may be filtered out by the filter member 60. The air filtered by the filter member 60 may be discharged to the second duct outlet 71b and the clothes support member 50 by the first blower fan 72.

The filter member 60 may include a dust collecting filter (not shown) for removing dust or a means for deodorization.

The chamber 11 starts the clothes care when the clothes are hung on the clothes support member 50 and the door 20 is closed. In this case, in the chamber 11, air may be circulated along the first circulation flow path 39 and the second circulation flow path 70.

The clothes care apparatus 1 includes a dehumidification flow path 100 provided in the door 20 so as to connect the chamber 11 to the outside upon the dehumidification of the indoor. The dehumidification flow path 100 may be provided on the door 20. The dehumidification flow path 100 may be provided in plural.

Further, sensor portions 240-1 and 240-2 may be provided inside or outside the clothes care apparatus. The sensor portions 240-1 and 240-2 may be provided as sensors configured to measure a temperature and humidity. The sensor portions 240-1 and 240-2 may be provided inside the clothes care apparatus, and alternatively, may be provided inside and outside of the clothes care apparatus according to embodiments.

Figure 5:
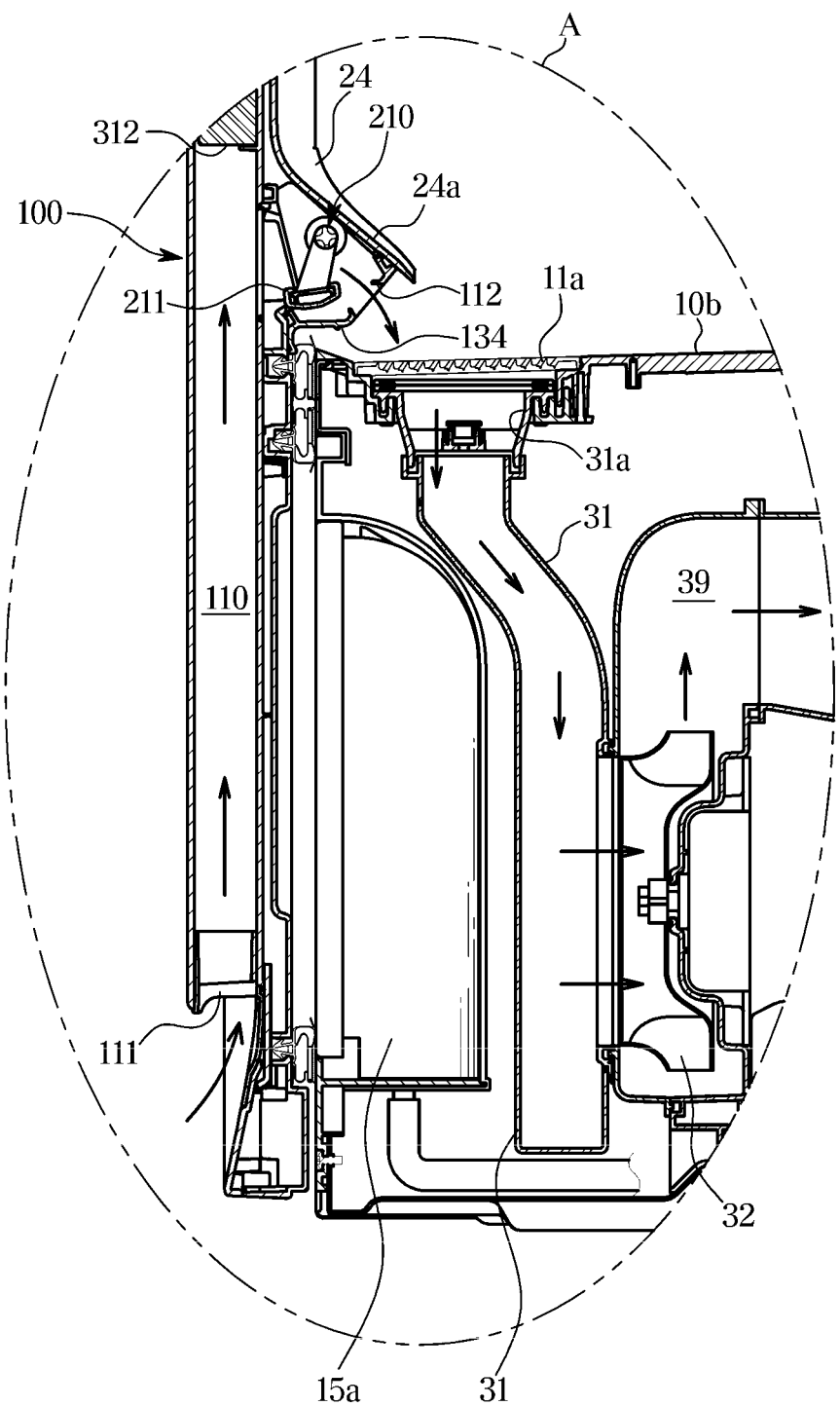
FIG. 5 is a view illustrating a lower damper according to an embodiment of the disclosure.

FIG. 5 is a view illustrating a second damper 210 according to an embodiment of the disclosure.

FIG. 5 is a view illustrating a part A of FIG. 3 in detail.

The dehumidification flow path 100 may be provided in a first door frame 310. An inlet flow path 110 may be provided in the first door frame 310.

In the inlet flow path 110, air flowing through a first inlet 111 flows and is discharged to the chamber 11 through a first outlet 112.

The inlet flow path 110 may include an inlet flow path duct 130 configured to guide air flowing through the first inlet 111 to flow. The first outlet 112 may be formed in the inlet flow path duct 130.

The inlet flow path 110 may include the second damper 210 configured to open and close the first outlet 112. The second damper 210 may be provided inside the inlet flow path duct 130. The second damper 210 may include a first flow path opening and closing member 211 configured to open and close the first outlet 112, and a first motor 212 configured to rotate the first flow path opening and closing member 211.

The outside air may flow into the clothes care apparatus from the second damper 210. The outside air may be heated in the second damper 210 by the heat exchanger. In addition, the outside air may flow directly into the chamber from the second damper 210.

Figure 6:
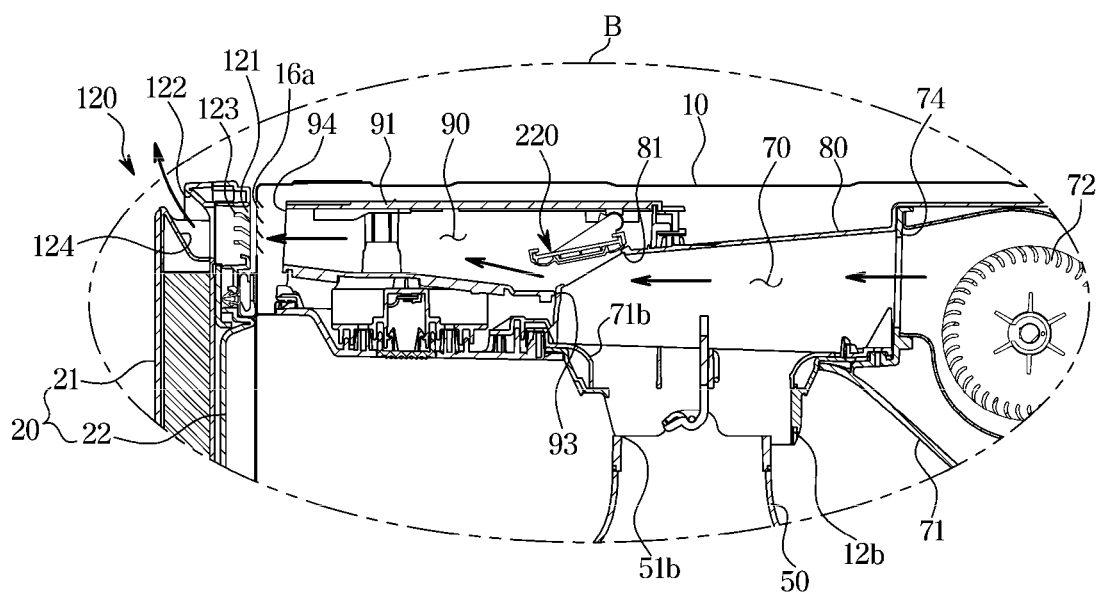
FIG. 6 is a view illustrating an upper damper according to an embodiment of the disclosure.

FIG. 6 is a view illustrating a first damper 220 according to an embodiment of the disclosure.

FIG. 6 is a view illustrating a part B of FIG. 3 in detail.

Referring to FIG. 6, in a connection duct 91, the first damper 220 is provided to regulate the connection between the connection duct and the second circulation flow path 70. The first damper 220 is configured to open and close a connection flow path hole 81 of the top cover 80. The first damper 220 may include a second flow path opening and closing member 221 configured to open and close the connection flow path hole 81, and a second motor 222 configured to rotate the second flow path opening and closing member 221.

The air flowing from the second damper 210 may be discharged to the outside through the first damper 220.

Meanwhile, referring to FIGS. 5 and 6, in a state in which the first damper and the second damper are closed, the drying cycle may start. The first damper and the second damper may be allowed to opened or closed based the temperature and humidity of the inside and the outside of the chamber, and thus it is possible to efficiently dry objects to be dried as described below. A description thereof will be described in detail.

Figure 7:
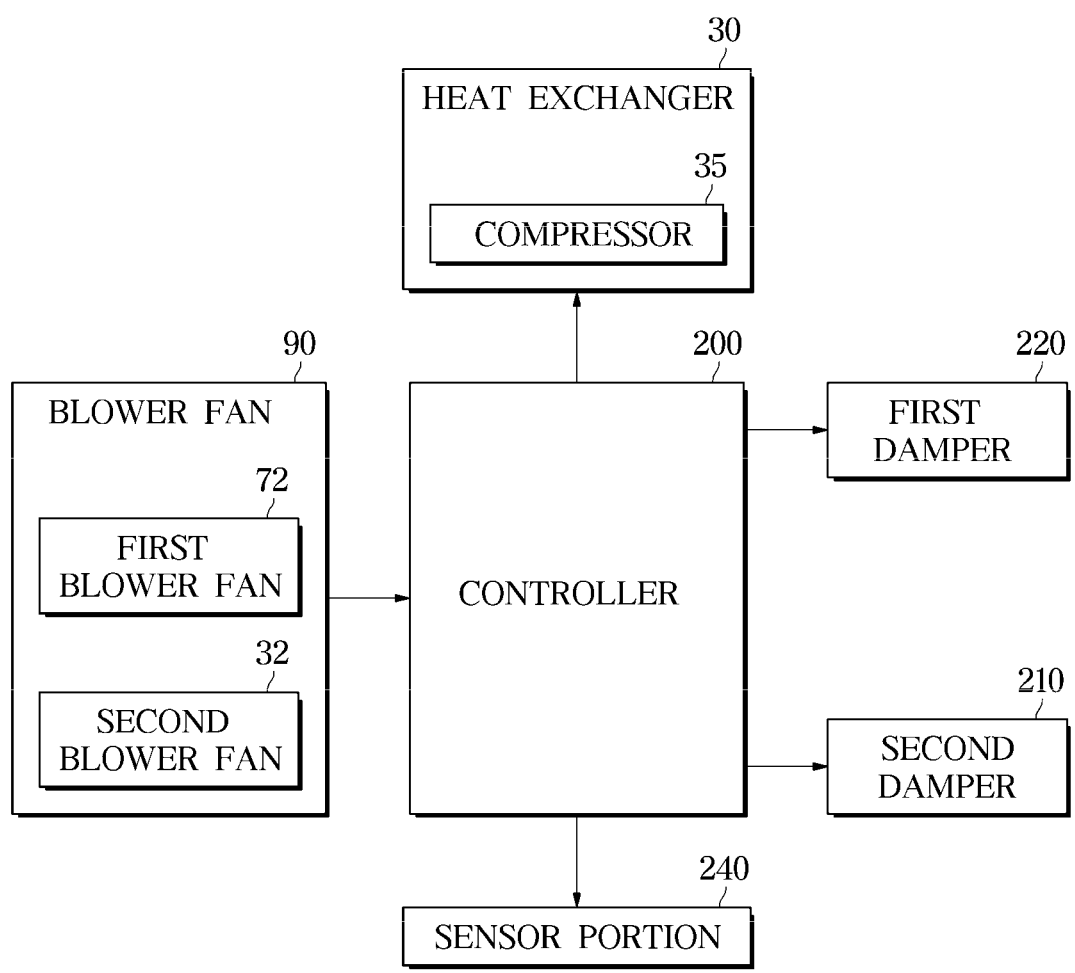
FIG. 7 illustrates a control block diagram of the clothes care apparatus according to an embodiment of the disclosure.

FIG. 7 illustrates a control block diagram of the clothes care apparatus 1 according to an embodiment of the disclosure.

Referring to FIG. 7, the clothes care apparatus 1 may include a blower fan 90, the first damper 220, the second damper 210, the heat exchanger 30, the sensor portion 240, and a controller 200.

The blower fan may be provided as a configuration configured to generate an air flow. The blower fan 90 may include the first blower fan 72 corresponding to the first damper 220 and configured to generate the air flow from the chamber to the outside, and the second blower fan 32 corresponding to the second damper 210 and configured to generate the air flow from the outside to the heat exchanger 30.

The first damper 220 may be provided as an upper damper provided in the upper portion of the clothes care apparatus, and the second damper 210 may be provided as a lower damper provided in the lower portion of the clothes care apparatus.

The first damper 220 may correspond to the first blower fan 72. Particularly, as for controlling the flow of the outside air, the first damper 220 may be opened so as to induce the flow of the outside air by driving the first blower fan 72.

The second damper 210 may correspond to the second blower fan 32. The second damper 210 may be opened to introduce the outside air, and when the second blower fan 32 is driven as described below, the second damper 210 may induce the outside air to the heat exchanger 30 and heat the outside air.

The heat exchanger 30 may beat the air and supply the heated air to the chamber 11.

The sensor portion 240 may obtain a temperature and humidity of the inside of the clothes care apparatus 1. In addition, the sensor portion 240 may be provided on the outside of the clothes care apparatus 1 to obtain a temperature and humidity of the outside of the clothes care apparatus 1.

The controller 200 may determine an external absolute humidity and an internal absolute humidity of the clothes care apparatus 1 based on the temperature and humidity obtained by the sensor portion 240.

The controller 200 may perform the drying cycle using the inside air through the heat exchanger. Further, the controller 200 may use the outside air for drying objects to be dried by opening the damper when a temperature and humidity of the inside of the chamber meet predetermined conditions.

The controller 200 may open at least one of the first damper 220 and the second damper 210 based on the external absolute humidity and the internal absolute humidity. In addition, the first blower fan 72 may be driven according to the opening of the first damper 220. In addition, the controller 200 may control the operation of the heat exchanger 30 based on the external absolute humidity and internal absolute humidity. Particularly, when the external absolute humidity is lower than the internal absolute humidity, the controller 200 may directly dry the clothes placed in the clothes care apparatus by using the outside air. At this time, the controller 200 may stop driving of the compressor 35.

Absolute humidity may refer to the mass of water vapor contained per unit volume.

The controller 200 may start the drying cycle by closing the first damper 220 and the second damper 210 and driving the second blower fan 32 and the heat exchanger 30.

However, the controller 200 may determine the drying efficiency to the power according to the performance of the drying cycle.

At this time, the controller may determine the drying efficiency based on the humidity and temperature of the chamber. Particularly, the controller may determine that the drying efficiency is inappropriate when the temperature of the chamber exceeds 40° C. and the humidity is less than 40%.

When the chamber is in the above-mentioned condition, the controller may determine that the chamber meets a predetermined condition.

The predetermined condition may represent a condition that allows the clothes care apparatus to use the outside air to dry objects to be dried.

When the condition of the chamber meets the predetermined condition, the controller 200 may open at least one of the first damper 220 and the second damper and drive at least one of blower fans 72 and 32 based on the external absolute humidity and the internal absolute humidity, thereby introducing the outside air.

When the external absolute humidity is less than the internal absolute humidity, the controller 200 may stop driving of the compressor 35. Accordingly, it is possible to achieve the efficient power management.

The controller 200 may start to control of opening the damper based on the humidity and temperature of the chamber.

When the external absolute humidity is less than the internal absolute humidity, the controller 200 may open at least one of the first damper 220 and the second damper 210 and drive at least one of the first blower fan 72 and the second blower fan 32. Accordingly, air may flow from the second damper 210 to the first damper 220 through the chamber 11.

However, when only the second blower fan 32 is driven, air may be discharged into the chamber without being heated by the heat exchanger.

The controller 200 may open the second damper 210 to introduce the outside air into the clothes care apparatus 1. In this case, the controller 200 may stop driving of the compressor 35 for the efficiency of power.

In addition, in this case, upon introducing the outside air, the controller 200 may drive the first blower fan 72 to directly introduce the outside air into the chamber 11 without passing through the heat exchanger 30.

When the external absolute humidity exceeds the internal absolute humidity, the controller 200 may close the first damper 220 and drive the second blower fan 32 and the compressor 35

In this case, because it is difficult to perform the appropriate drying cycle using the outside air as it is, the controller 200 may introduce the outside air and heat the air by the heat exchanger 30 and then supply the heated air to the chamber.

Based on this operation, the controller may generate the air flow in which air sequentially flows in the second damper 210, the heat exchanger 30, the chamber 11 and the first damper 220.

When the outside air is supplied to the chamber 11 through the heat exchanger 30, the controller 200 may allow the heat exchanger 30 to consume predetermined power consumption.

According to an embodiment, the controller 200 may drive the compressor 35 included in the heat exchanger 30 at a predetermined frequency (such as a minimum frequency).

The minimum frequency may represent a frequency that is applied to consume the power less than the power that is consumed by the compressor in the drying cycle before opening the damper.

Particularly, the minimum frequency may represent a frequency that is applied when driving the compressor 35 included in the heat exchanger 30 with minimum power.

That is, the minimum frequency may represent a low frequency capable of generating hot or cold air by driving the compressor.

In addition, the minimum frequency may represent the smallest frequency among the range of frequencies for driving the compressor 35.

When the external humidity is greater than or equal to a predetermined value, the controller 200 may close the first damper 220 and the second damper 210, and drive the blower fans 32 and 72 and the heat exchanger 30, thereby drying objects to be dried in the chamber. According to an embodiment, the predetermined value of the external humidity described above may be set to be 85%.

The sensor portion 240 may be provided inside the clothes care apparatus 1.

Based on the temperature and humidity of the inside of the clothes care apparatus 1 at a start timing of the drying cycle, the controller 200 may determine an external absolute humidity.

At the start timing of the drying cycle, the absolute humidity of the inside of the clothes care apparatus 1 may be the same as the absolute humidity of the outside of the clothes care apparatus 1.

Accordingly, the controller 200 may determine the absolute humidity of the inside of the clothes care apparatus 1 based on the information obtained by the sensor portion 240 provided therein. For the above-described operation, the controller may open the first damper and the second damper before starting the drying cycle.

Based on this operation, the controller 200 may determine the absolute humidity of the inside of the clothes care apparatus 1 at the start timing of the drying cycle as the absolute humidity of the outside of the clothes care apparatus 1.

According to another embodiment, the sensor portion 240 may be provided on the outside of the clothes care apparatus 1 in the form of an external sensor as well as being provided inside the clothes care apparatus 1.

In this case, the controller 200 may determine the internal absolute humidity based on the temperature and humidity obtained by an internal sensor, and determine the external absolute humidity based on the temperature and humidity obtained by an external sensor.

The controller 200 may include a memory (not shown) configured to store an algorithm for controlling an operation of components in the clothes care apparatus 1 or configured to store data about a program implementing the algorithm, and a processor (not shown) performing the above mentioned operation using the data stored in the memory. The memory and the processor may be implemented in separate chips, or a single chip.

At least one component may be added or deleted in accordance with the performance of the components of the clothes care apparatus 1 shown in FIG. 7. In addition, it will be readily understood by those skilled in the art that the location of components may be changed in accordance with the performance or structure of the system.

Figure 8:
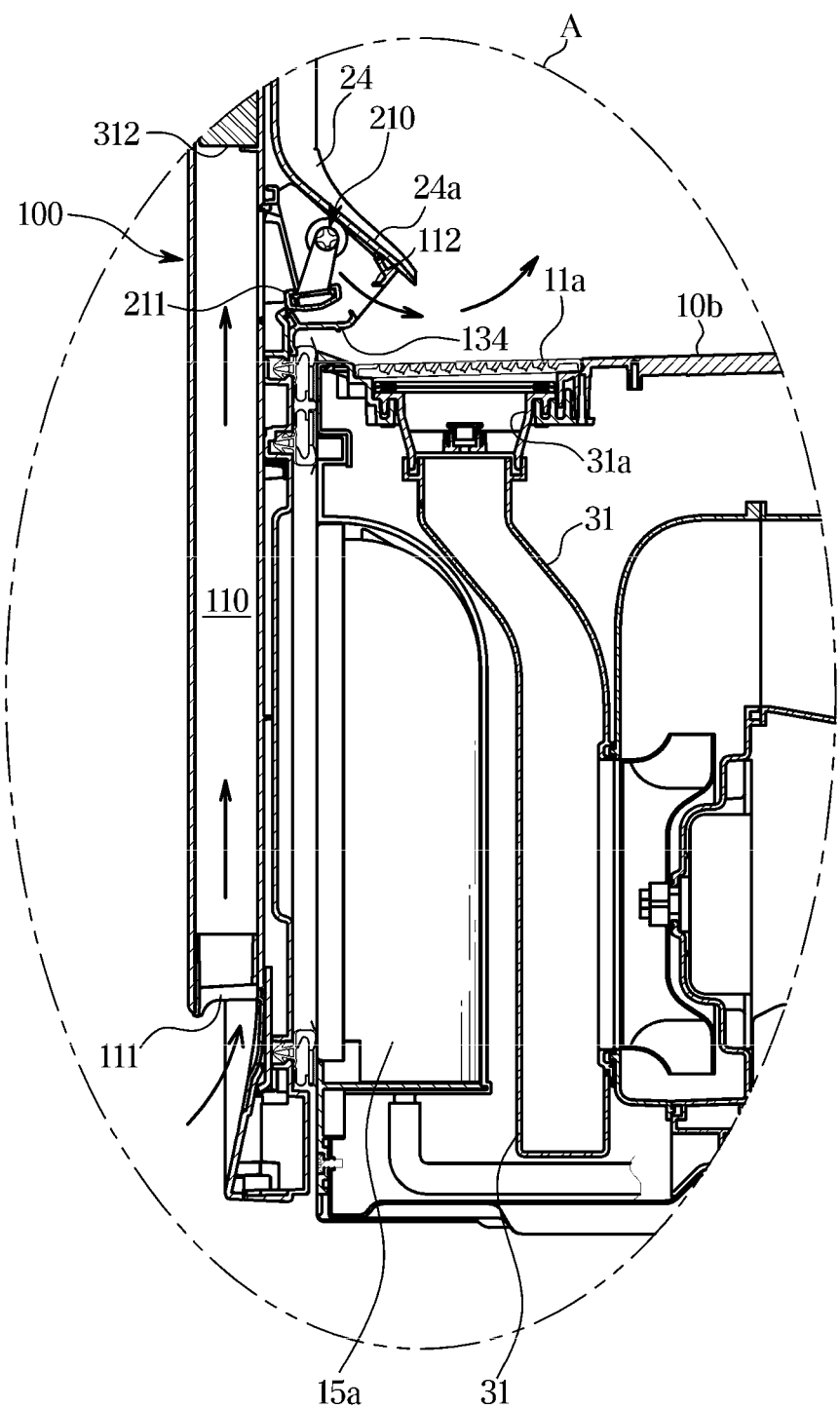
FIG. 8 is a view illustrating a flow of outside air according to an embodiment of the disclosure.

FIG. 8 is a view illustrating a flow of outside air according to an embodiment of the disclosure.

The controller 200 of the clothes care apparatus 1 may drive the first blower fan so as to directly introduce the outside air into the chamber. When the external absolute humidity is lower than the internal absolute humidity, the controller may perform the following operation.

Particularly, air, which is introduced into the inlet flow path 110 through the first inlet 111 of the clothes care apparatus, may be discharged to the chamber 11 through the first outlet 112. At this time, the second damper 210 may be opened.

However, the air introduced as mentioned above may be directly introduced into the chamber 11 without passing through the heat exchanger 30. In addition, in this case, at least one of the blower fans 72 and 32 may be operated and the first damper 220 may be opened.

When the first blower fan 72 is driven, the first damper 220 and the second damper 210 may be opened to allow the outside air to flow in. The outside air may be directly discharged to the outside through the chamber 11 without passing through the heat exchanger 30.

That is, when the external absolute humidity is lower than the internal absolute humidity of the clothes care apparatus, the controller 200 may use the outside air for drying an object to be dried as it is.

Figure 10A:
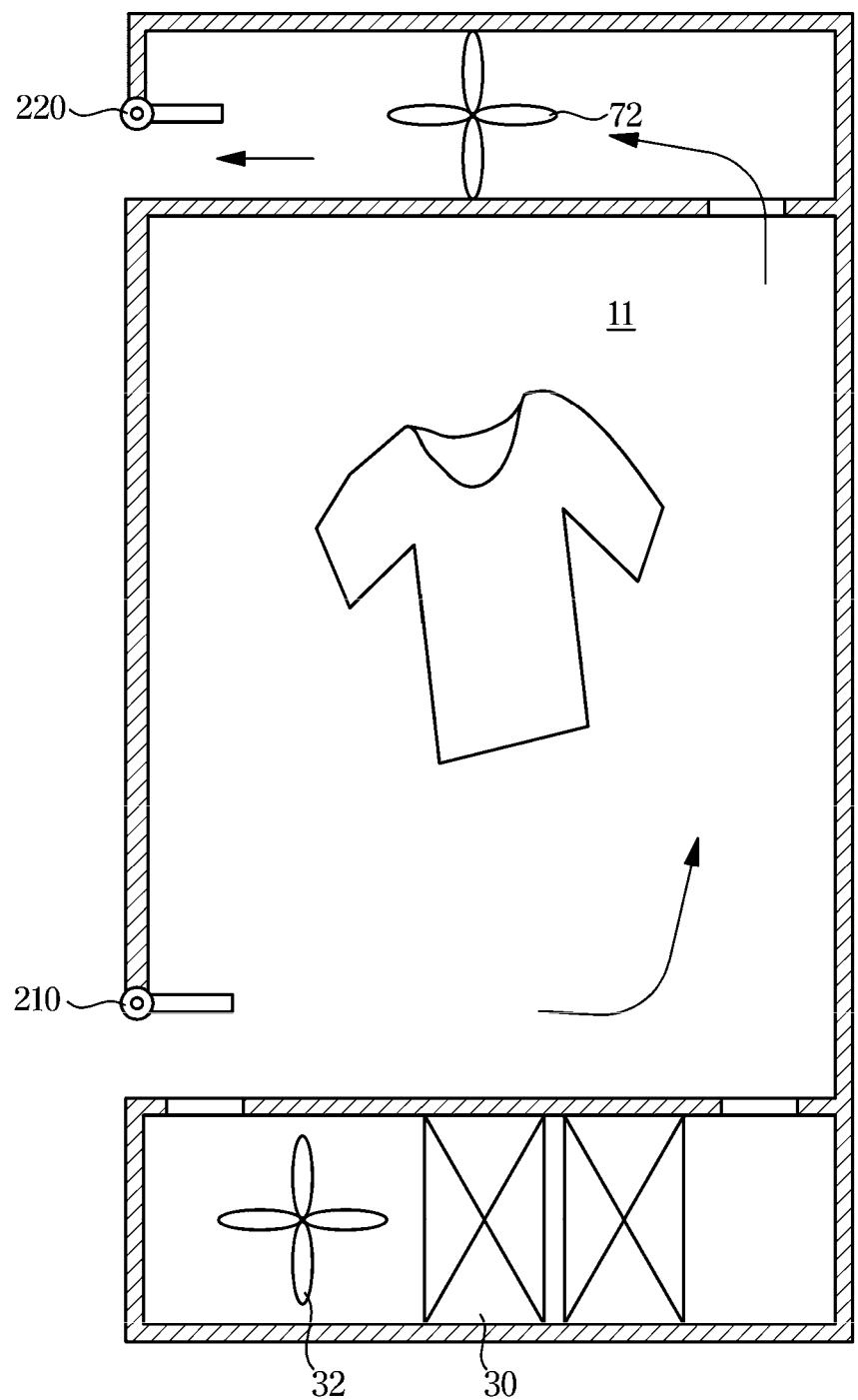
FIGS. 10A and 10B are schematic views illustrating an operation of the damper, the fan and the heat exchanger according to an embodiment of the disclosure.
Figure 10B:
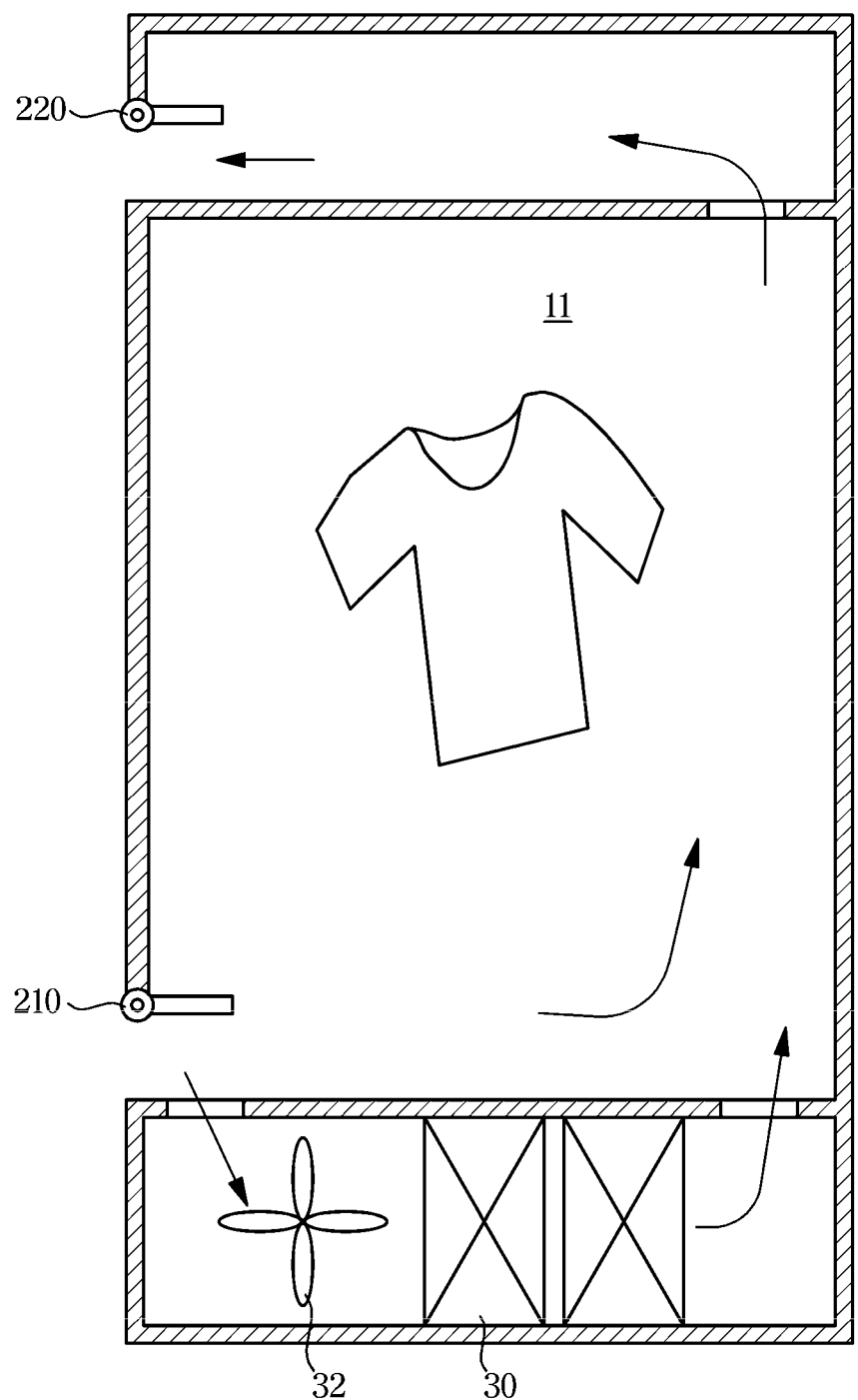
Figure 11:
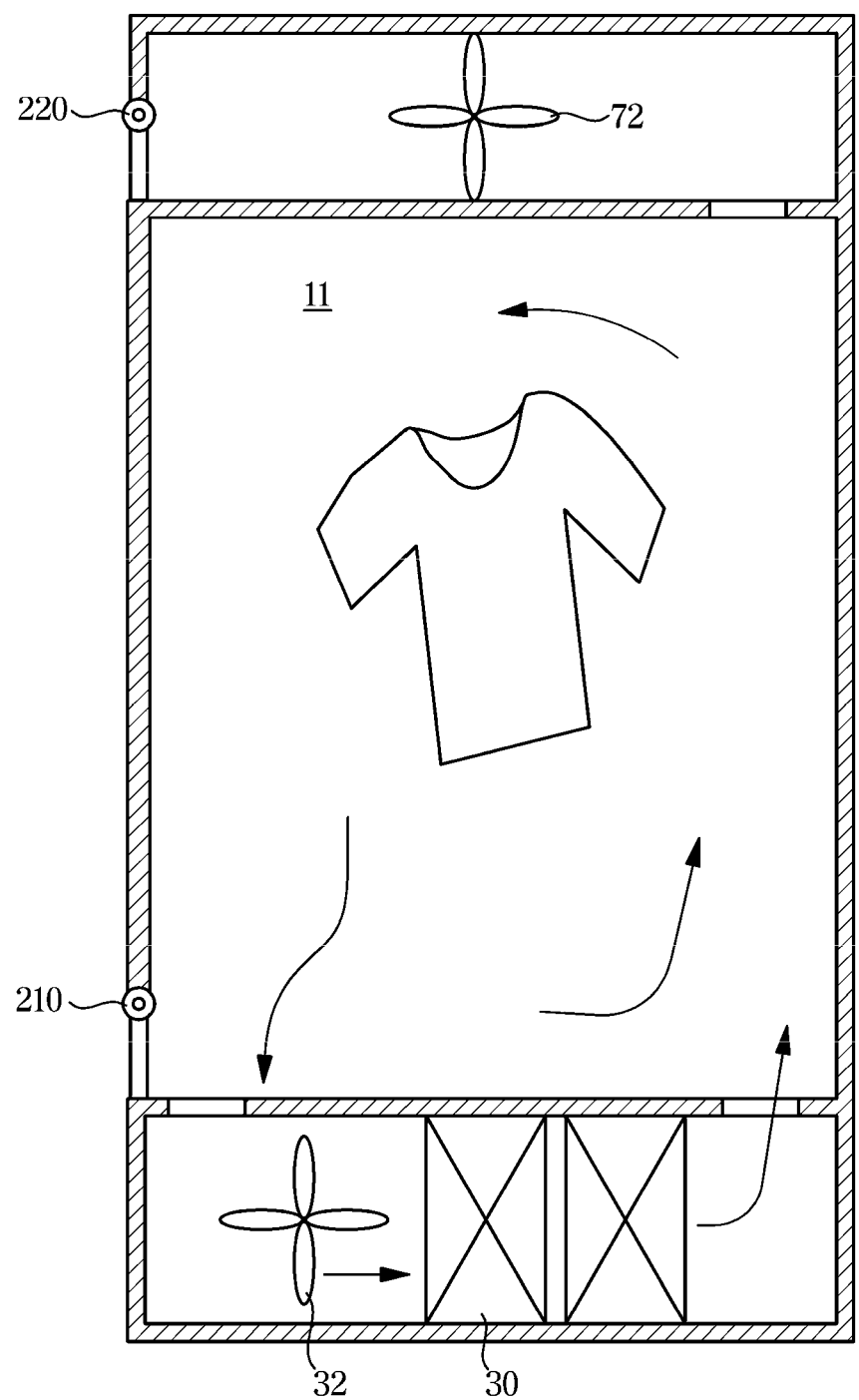
FIG. 11 is a view illustrating an operation of the damper, the fan and the heat exchanger according to an embodiment of the disclosure.

FIGS. 9 to 11 are views illustrating an operation of the damper, the fan and the heat exchanger according to an embodiment of the disclosure.

Figure 9A:
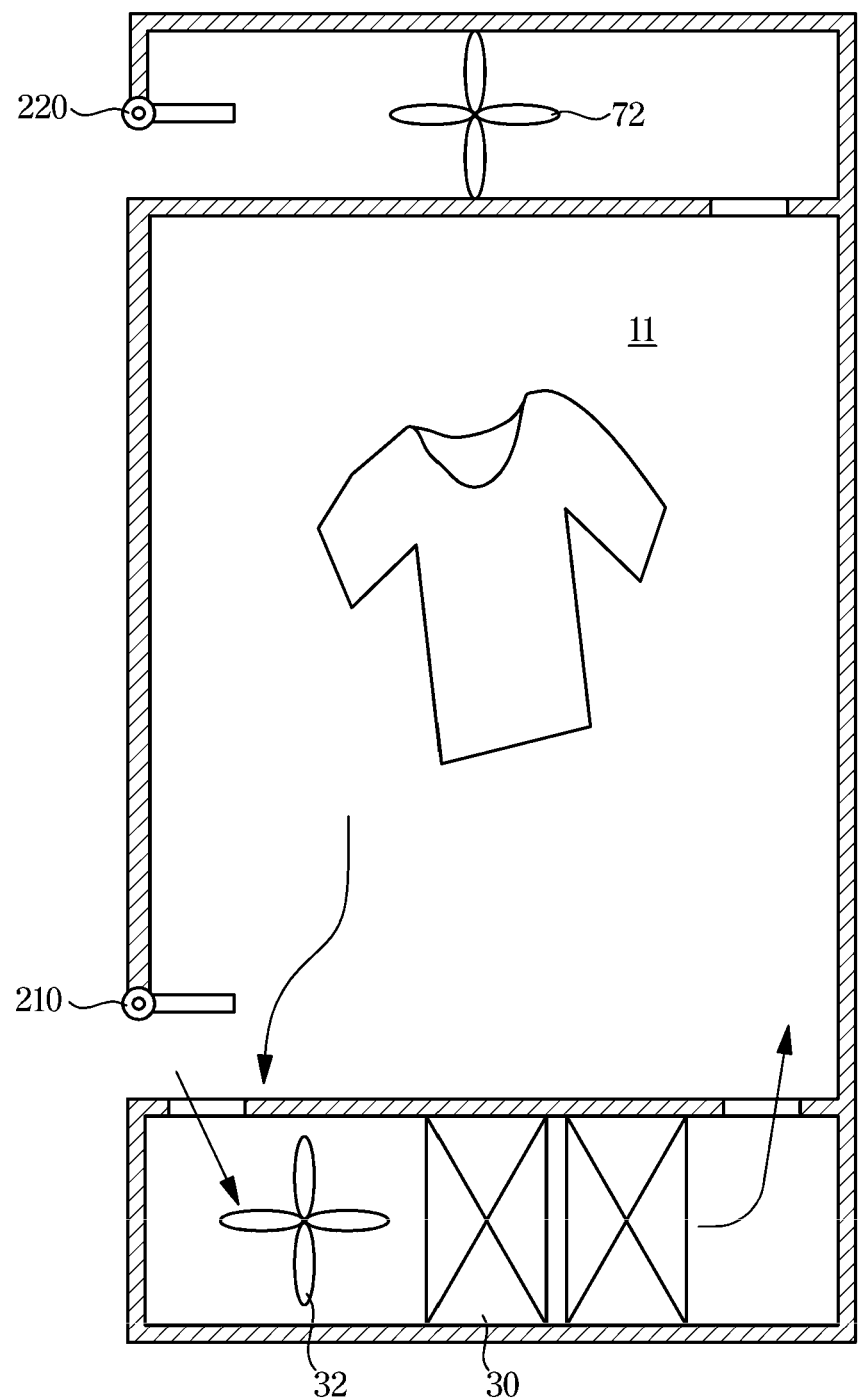
FIGS. 9A and 9B are schematic views illustrating an operation of a damper, a fan and a heat exchanger according to an embodiment of the disclosure.
Figure 9B:
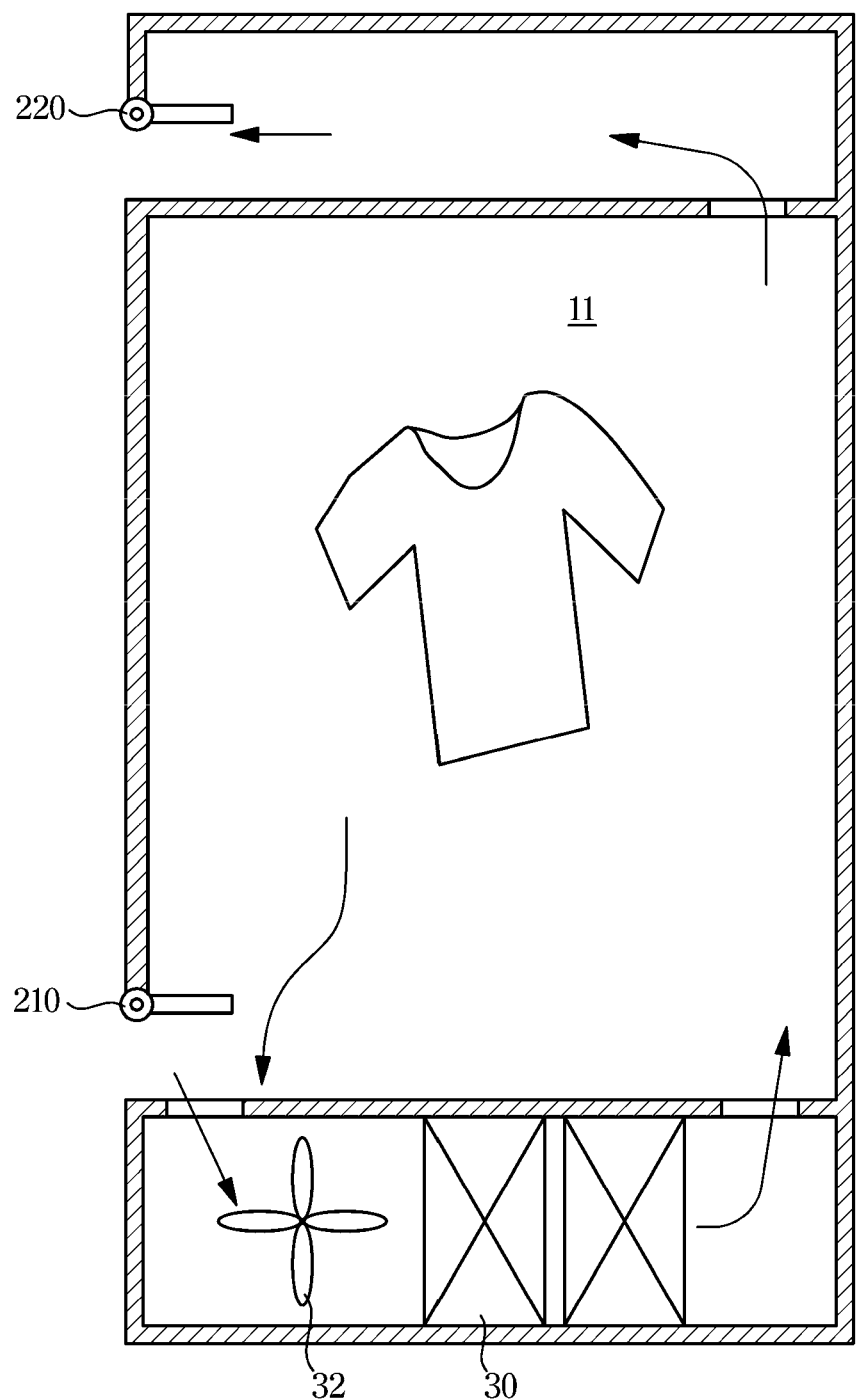

FIGS. 9A and 9B are schematic views illustrating an operation of the clothing care apparatus when the external absolute humidity is higher than the internal absolute humidity.

FIG. 9A is a view illustrating the clothes care apparatus provided with the first blower fan 72 and the second blower fan 32.

In this case, the controller may supply the outside air to the chamber through the heat exchanger. The controller may control the second damper 210, the second blower fan 32 and the heat exchanger 30 based on the humidity of the inside of the chamber 11.

Particularly, the controller 200 may open the second damper 210 and drive the second blower fan 32 to introduce the outside air. Meanwhile, the controller 200 may allow the first blower fan 72 to be driven or not. When the first blower fan is driven, the air may be discharged more quickly from the chamber to the outside.

The controller 200 may introduce the outside air and heat the outside air in the heat exchanger 30. The heat exchanger 30 may beat the outside air and discharge air having a low humidity into the chamber 11. The controller 200 may drive the second blower fan 32 to generate an air flow in which air flows from the second damper 210 to the chamber 11 through the heat exchanger 30.

However, in this case, the controller 200 may drive the compressor 35 at the minimum frequency. According to an embodiment, the controller 200 may drive the compressor 35 of the heat exchanger 30 by fixing the driving frequency to the minimum frequency.

On the other hand, referring to FIG. 9B, the above operation may be implemented by using a single blower fan. When the clothes care apparatus is implemented with a single blower fan (such as the second blower fan 32), the controller may open the first damper 220 and the second damper 210 and drive the second blower fan 32.

By driving the second blower fan 32, the controller may introduce outside air to the inside of the clothes care apparatus and discharge air to the outside of the clothes care apparatus. FIGS. 10A and 10B are schematic views illustrating an operation of the clothing care apparatus when the external absolute humidity is less than the internal absolute humidity.

FIG. 10A is a view illustrating the clothes care apparatus provided with the first blower fan and the second blower fan. In this case, the clothes care apparatus 1 may directly use outside air to dry an object to be dried in the chamber 11.

The controller 200 may open the first damper 220 and the second damper 210 and start to drive the first blower fan 72. In addition, the controller 200 may stop driving of the compressor 35.

The controller 200 may open the first damper 220 and start to drive the first blower fan 72 so as to introduce outside air. Unlike FIG. 9, the outside air may not be introduced into the heat exchanger but directly introduced into the chamber 11. Based on the above mentioned operation, the controller 200 may generate an air flow, in which air flows from the second damper 210 to the first damper 220 through the chamber 11.

In FIG. 10, because the absolute humidity of the outside air is lower than the humidity of the inside of the clothes care apparatus, the controller may directly use the outside air for drying objects to be dried.

In addition, for efficient power management, the controller 200 may stop driving of the compressor 35. Because it is possible to efficiently dry objects to be dried only with the outside air itself, the controller 200 may stop driving of the compressor 35 to prevent power loss.

On the other hand, referring to FIG. 10B, the above operation may be implemented by using a single blower fan. When the clothes care apparatus is implemented with a single blower fan (such as the second blower fan 32), the controller may open the first damper 220 and the second damper 210 and drive the second blower fan 32. In this case, outside air may be introduced into the heat exchanger 30 through the second damper.

Meanwhile, as in FIG. 10A, the controller may stop the operation of the compressor 35 when the external absolute humidity is less than the internal absolute humidity.

Therefore, the outside air may be introduced into the heat exchanger 30 but be discharged into the chamber 11 without being heated.

By driving the second blower fan, the controller may introduce the outside air to the inside of the clothes care apparatus and discharge the air to the outside of the clothes care apparatus.

FIG. 11 is a view illustrating an operation when the external humidity is higher than or equal to a predetermined value.

When the outside air is introduced in a state in which the external humidity is higher than or equal to the predetermined value, efficiency may be lowered. Therefore, the controller may be operated as described below without opening the damper.

Even when the internal humidity and temperature of the clothes care apparatus meet predetermined conditions, the controller 200 may drive the second blower fan 32 to supply the inside air to the chamber 11 through the heat exchanger 30 when the external humidity is higher than or equal to the predetermined value. According to an embodiment, the predetermined value may be set to be 85%.

In this case, the controller may maintain a closed state of the first damper 220 and the second damper 210.

When the external humidity itself is high, it is difficult to use the outside air to dry an object to be dried, and thus the controller may raise the temperature of the inside air through the heat exchanger 30 and then provide the heated air to the chamber.

Accordingly, while closing the first damper 220 and the second damper 210, the controller may introduce the inside air to the heat exchanger 30 by using the second blower fan 32 and heat the inside air and then discharge the heated air to the chamber 11.

FIGS. 9 to 11 illustrate that the operation of the clothes care apparatus when the temperature and humidity of the chamber meet predetermined conditions after the drying cycle starts.

Particularly, the above operations illustrate an operation that is performed when the temperature and humidity of the chamber of the clothes care apparatus meet the predetermined condition during the drying cycle that is performed by using the inside air by using the heat exchanger.

However, the operation described with reference to FIGS. 9 to 11 is only one embodiment of the disclosure, and thus the operation of the first damper 220, the second damper 210, the first blower fan 72, and the second blower fan 32 and the heat exchanger 30 for the efficient dying is not limited thereto.

Figure 12A:
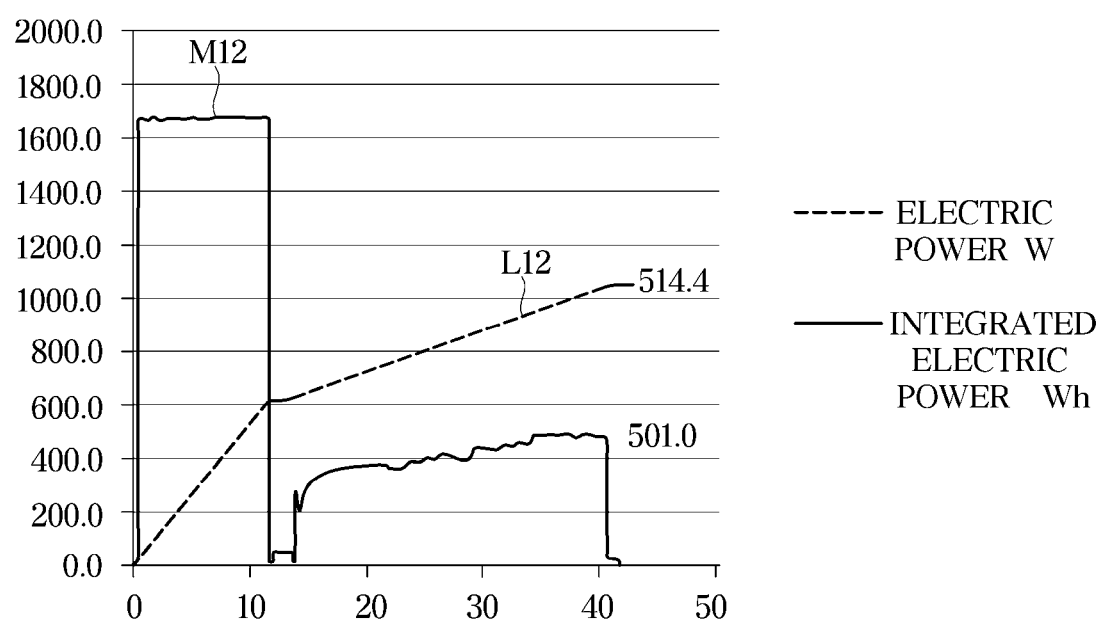
FIG. 12A is a view illustrating an operation for determining a reference time according to an embodiment of the disclosure.
Figure 12B:
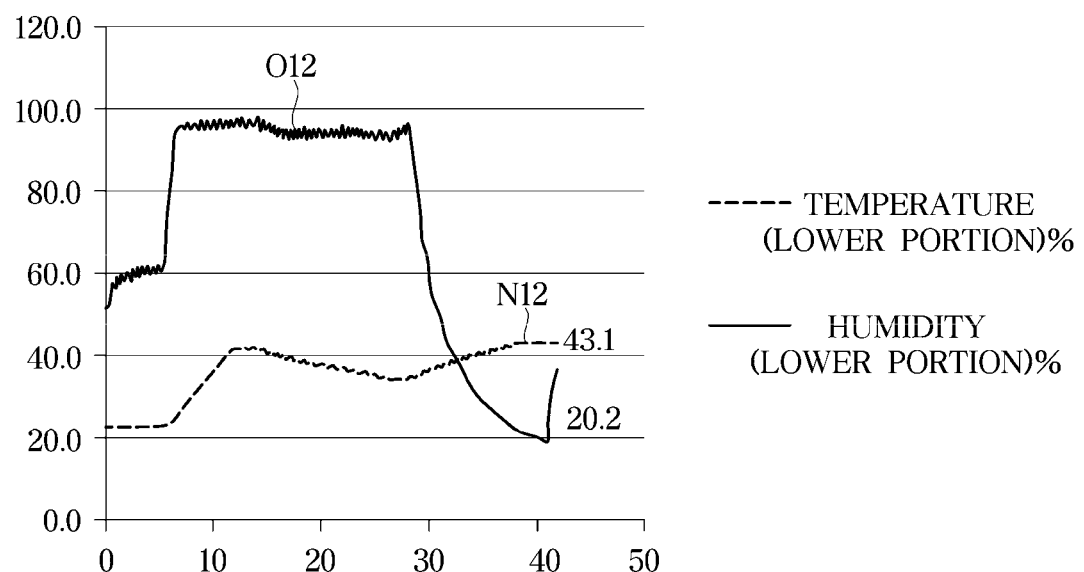
FIG. 12B is a view illustrating the operation for determining the reference time according to an embodiment of the disclosure.

FIGS. 12A and 12B are views illustrating an operation for determining a predetermined reference according to an embodiment of the disclosure; and FIGS. 12A and 12B are graphs illustrating changes in consumption input and an internal humidity and temperature in each operation during the drying cycle of the clothes care apparatus.

Referring to FIGS. 12A and 12B, it is shown that a slope of the change in humidity of the clothes care apparatus is rapidly lowered in an operation in which a consumption input of the heat exchanger 30 is the highest of 501 W.

Therefore, this section corresponds to an inefficiency section in the drying cycle with respect to the consumption input.

Meanwhile, upon entering this section, the temperature of the chamber of the clothes care apparatus may exceed the reference temperature, and the humidity of the chamber may drop below the reference humidity. According to an embodiment, the reference temperature may be determined to be 40° C. and the reference humidity may be determined to be 40%.

In this section, the controller 200 may dry an object to be dried using the outside air instead of driving the heat exchanger 30.

The controller 200 may stop driving of the compressor 35 and start to drive the first damper 220 and the second damper 210 and drive the first blower fan 72 when the predetermined condition is satisfied.

As illustrated in FIGS. 12A and 12B, the controller 200 may determine the predetermined reference based on the change in the internal humidity of the clothes care apparatus N12 and the power consumption of the clothes care apparatus M12, and L12.

Particularly, the controller 200 may determine a reference timing based on a ratio of the change in the internal humidity and power consumption.

Further, as described above, the controller may determine whether the condition of the clothes care apparatus meet the predetermined condition or not based on the reference temperature and the reference humidity.

Meanwhile, in FIGS. 12A and 12B, at a timing corresponding to 40 minutes, the power of 501 W is consumed but the humidity change is small. Therefore, the controller 200 may determine that the condition of the chamber of the clothes care apparatus meets the predetermined condition at 40 minutes. The reference timing may be determined in real time by the controller 200 or may be determined in advance.

As described later, the controller 200 may determine whether to use the outside air for drying based on the external absolute humidity and the internal absolute humidity at the reference timing Particularly, when the predetermined condition is satisfied, the controller 200 may open the second damper 210, and drive the second blower fan 32 and the heat exchanger 30.

The controller 200 may start to open the first damper 220 and drive the first blower fan 72 based on the external absolute humidity and the internal absolute humidity at the reference timing determined based on the above-described method.

Particularly, when the external absolute humidity is less than the internal absolute humidity at the reference timing, the controller 200 may start to open the first damper 220 and the second damper 210, and drive the first blower fan 72, and stop driving the compressor 35. In addition, in this case, the controller 200 may stop driving of the second blower fan 32 and the compressor 35.

In this case, the outside air may be directly introduced into the chamber without passing through the heat exchanger 30 and used for drying an object to be dried.

However, even in this case, when the external humidity is high, the controller 200 may drive the second blower fan to introduce the outside air into the heat exchanger 30.

On the other hand, when the external absolute humidity is greater than the internal absolute humidity, the controller 200 may dry the object to be dried in the chamber by opening the second damper 210, and driving the second blower fan 32 and the heat exchanger 30.

In this case, as described above, the controller 200 may allow the heat exchanger 30 to consume the minimum power, and allow the compressor 35 to operate at the minimum frequency.

The operations described with reference to FIGS. 12A and 12B are only an embodiment for describing the operation of the disclosure, and the operation of determining the reference timing is not limited thereto.

Figure 13:
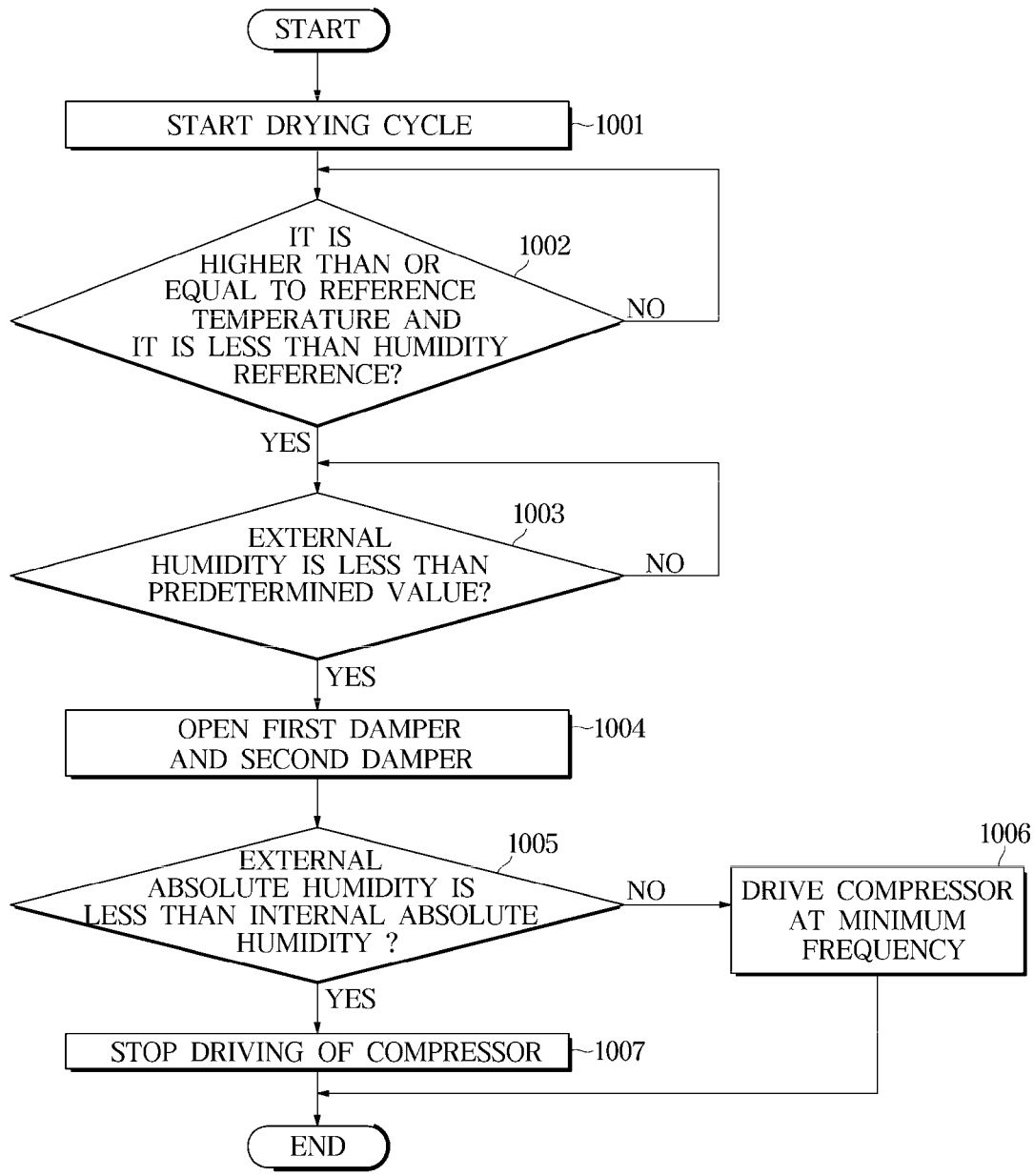
FIG. 13 illustrates a flowchart according to an embodiment of the disclosure.
Figure 14:
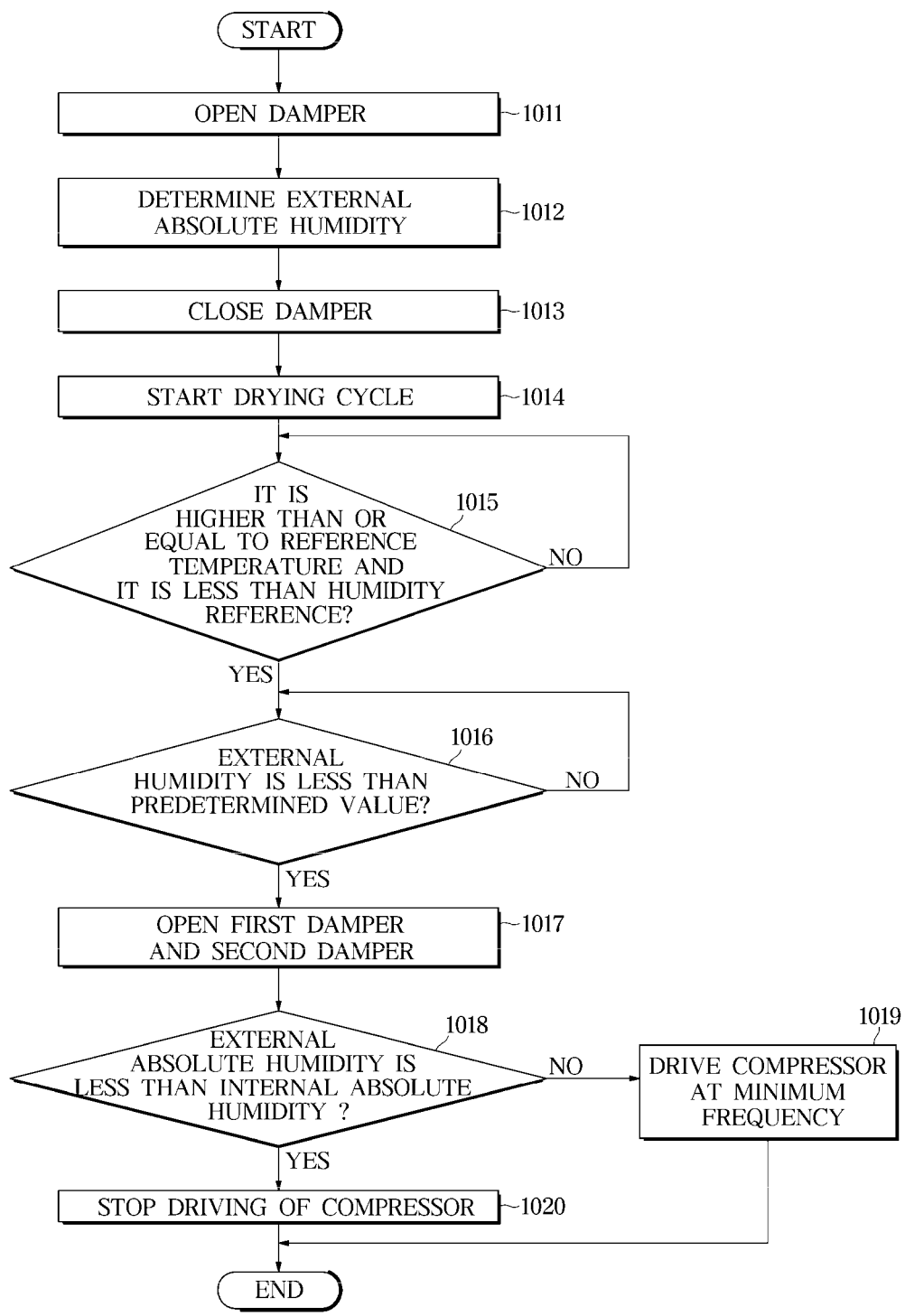
FIG. 14 illustrates a flowchart according to an embodiment of the disclosure.

FIGS. 13 and 14 illustrates flowcharts according to an embodiment of the disclosure.

FIG. 13 illustrates a view illustrating the operation of the clothes care apparatus when an external sensor and an internal sensor are provided.

The clothes care apparatus may start the drying cycle (step 1001), and the controller may determine whether the predetermined condition is satisfied or not (step 1002), which is whether or not the temperature of the chamber is higher than or equal to the reference temperature and the humidity of the chamber is less than the reference humidity.

However, when the external humidity is too high as described above, it is difficult to use the outside air for drying. Therefore, when the external humidity is less than a predetermined value (step 1003), the controller may use the outside air for drying the object to be dried, by opening the damper.

When the predetermined condition is satisfied, the controller may open the first and second dampers (step 1004). In addition, when the external humidity is less than the predetermined value, the controller may stop driving of the compressor (step 1007) and dry the object to be dried by using the outside air (step 1005).

However, when the external humidity is higher than the predetermined value, the controller may dry the object to be dried by driving the compressor at the minimum frequency (step 1006).

FIG. 14 is a view illustrating the operation of the clothes care apparatus when the internal sensor is provided.

The clothes care apparatus may open the damper (step 1011) before the drying cycle and determine the external absolute humidity based on the sensor provided therein (step 1012). The clothes care apparatus may close the damper (step 1013) and start the drying cycle (step 1014).

The clothes care apparatus may start the drying cycle (step 1014), and the controller may determine whether the predetermined condition is satisfied or not (step 1015), which is whether or not the temperature of the chamber is higher than or equal to the reference temperature and the humidity of the chamber is less than the reference humidity.

However, as described above, when the external humidity is too high, it is difficult to use the outside air for drying. When the external humidity is less than the predetermined value (step 1016), the controller may use the outside air for drying the object to be dried, by opening the damper.

When the predetermined condition is satisfied, the controller may open the first and second dampers (step 1017). In addition, when the external humidity is less than the predetermined value, the controller may stop driving of the compressor (step 1020) and dry the object to be dried by using the outside air (step 1018).

However, when the external humidity is higher than the predetermined value, the controller may dry the object to be dried by driving the compressor at the minimum frequency (step 1019).

In addition, in performing the above-described operation, the blower fan included in the clothes care apparatus may be operated. The blower fan may include at least one of the first blower fan configured to generate the air flow, in which the air flows from the chamber to the outside, and the second blower fan configured to generate the air flow, in which the air flows from the outside to the heat exchanger. That is, the clothes care apparatus may be implemented with a single blower fan or a plurality of blower fans.

The blower fan may be operated to introduce the outside air into the chamber when the external humidity is less than the internal humidity. Subsequently, the blower fan may be operated to discharge the air of the chamber to the outside. Meanwhile, even in this case, the outside air may be introduced into the chamber through the heat exchanger based on the operation of the blower fan.

The blower fan may be operated to introduce the outside air into the heat exchanger when the external humidity is greater than the internal humidity. In addition, the blower fan may be operated to discharge air from the chamber to the outside.

Meanwhile, when the external humidity exceeds the predetermined value, the blower fan may be operated to circulate the inside air without introducing the outside air.

As is apparent from the above description, the clothes care apparatus and the control method thereof may efficiently manage power by drying an object to be dried using the outside air and controlling a heat exchanger.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Although a few embodiments of the disclosure have been shown and described, it would be appreciated by those skilled in the art that changes may be made in these embodiments without departing from the principles and spirit of the disclosure, the scope of which is defined in the claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A clothes care apparatus comprising:
a chamber;
a first damper configured to control an airflow from inside the chamber to outside the chamber;
a second damper configured to control the airflow into the chamber from the outside of the chamber;
a heat exchanger provided with a compressor and configured to exchange heat with air in the chamber;
at least one blower fan configured to generate the airflow;
a sensor portion configured to obtain an internal temperature of the chamber, an internal humidity of the chamber, an external temperature of the chamber, and an external humidity of the chamber; and
a controller configured to:
start a drying cycle by using the heat exchanger to exchange heat with the air that is within the chamber, control the first damper and the second damper to be opened or closed, and
control the heat exchanger and the at least one blower fan by comparing the internal humidity with the external humidity when the internal temperature and the internal humidity satisfy a predetermined condition.

2. The clothes care apparatus of claim 1, wherein the controller is further configured to:
when the drying cycle starts:
closed the first damper and the second damper, and
performs driving of the at least one blower fan and the heat exchanger, and
when the internal humidity of the chamber is less than a reference humidity and the internal temperature of the chamber is higher than or equal to a reference temperature, determine that the predetermined condition is satisfied.

3. The clothes care apparatus of claim 1, wherein when an external absolute humidity is less than an internal absolute humidity, the controller is configured to:
stop driving of the compressor;
open the first damper and the second damper; and
drive the at least one blower fan to generate the airflow, wherein the airflow moves from the second damper through the chamber to the first damper.

4. The clothes care apparatus of claim 3, wherein:
the at least one blower fan comprises a first blower fan that is configured to generate the airflow from the chamber to the outside of the chamber, and
the controller is configured to drive the first blower fan to introduce the air into the chamber from the outside of the chamber.

5. The clothes care apparatus of claim 1, wherein when the external humidity exceeds the internal humidity, the controller is configured to:
drive the compressor,
open the first damper and the second damper, and
drive the at least one blower fan to generate the airflow, wherein the airflow moves from the second damper through the heat exchanger to the chamber.

6. The clothes care apparatus of claim 5, wherein the at least one blower fan comprises a second blower fan configured to generate the airflow from the outside of the chamber to the heat exchanger.

7. The clothes care apparatus of claim 5, wherein the controller is further configured to drive the compressor at a predefined frequency.

8. The clothes care apparatus of claim 7, wherein the predefined frequency corresponds to a frequency that when applied to the compressor, the compressor consumes less power than the compressor consumed before the predetermined condition is satisfied.

9. The clothes care apparatus of claim 1, wherein when the external humidity exceeds a predetermined value, the controller is configured to:
close the first damper and the second damper; and
drive the at least one blower fan and the compressor.

10. The clothes care apparatus of claim 1, wherein:
the sensor portion is provided inside the chamber, and
the controller is configured to:
open the first damper and the second damper at a start timing of the drying cycle, and
determine an external absolute humidity based on the internal temperature and the internal humidity of an inside of the clothes care apparatus.

11. The clothes care apparatus of claim 1, wherein:
the sensor portion comprises:
an internal sensor provided inside the clothes care apparatus, and
an external sensor provided outside of the clothes care apparatus, and the controller is further configured to:
determine an internal absolute humidity based on a temperature and humidity obtained by the internal sensor, and
determine an external absolute humidity based on a temperature and humidity obtained by the external sensor.

12. The clothes care apparatus of claim 1, wherein:
the internal humidity corresponds to an absolute humidity inside of the chamber, and
the external humidity corresponds to an absolute humidity outside of the clothes care apparatus.

13. A control method of a clothes care apparatus comprising:
obtaining an internal temperature of a chamber of the clothes care apparatus, an internal humidity of the chamber, an external temperature of the chamber, and an external humidity of the chamber;
performing a drying cycle by exchanging heat of a heat exchanger provided with a compressor with air;
controlling a first damper and a second damper to be opened or closed; and
controlling the heat exchanger and at least one blower fan by comparing the internal humidity with the external humidity when the internal temperature and the internal humidity satisfy a predetermined condition.

14. The control method of claim 13, wherein:
performing the drying cycle comprises:
closing the first damper and the second damper, and
performing driving of the at least one blower fan and the heat exchanger; and
when the internal humidity of the chamber is less than a reference humidity and the internal temperature of the chamber is higher than or equal to a reference temperature, determining that the predetermined condition is satisfied.

15. The control method of claim 13, wherein controlling the first damper and the second damper, the heat exchanger, and the at least one blower fan comprises:
stopping driving of the compressor when an external absolute humidity is less than an internal absolute humidity;
opening the first damper and the second damper; and
driving the at least one blower fan to generate an airflow from the second damper through the chamber to the first damper.

16. The control method of claim 15, wherein:
the at least one blower fan comprises a first blower fan for generating the airflow from the chamber to outside the chamber, and
controlling of the at least one blower fan comprises driving the first blower fan for introducing the air into the chamber.

17. The control method of claim 13, wherein controlling the first damper and the second damper, the heat exchanger, and the at least one blower fan comprises:
driving the compressor when the external humidity exceeds the internal humidity;
opening the first damper and the second damper; and
driving the at least one blower fan to generate an airflow from the second damper through the heat exchanger to the chamber.

18. The control method of claim 17, wherein the at least one blower fan comprises a second blower fan configured to generate the airflow from outside the clothes care apparatus to the heat exchanger.

19. The control method of claim 17, further comprising: driving the compressor at a predefined frequency.

20. The control method of claim 19, wherein the predefined frequency corresponds to a frequency that when applied to the compressor, the compressor consumes less power than the compressor consumed before the predetermined condition is satisfied.

21. The control method of claim 13, wherein controlling the first damper and the second damper, the heat exchanger, and the at least one blower fan comprises:
    closing the first damper and the second damper, and
    driving the at least one blower fan and the compressor when the external humidity exceeds a predetermined value.

22. The control method of claim 13, wherein the obtaining of the internal temperature, the internal humidity, the external temperature, and the external humidity comprises:
    opening the first damper and the second damper at a start timing of the drying cycle; and
    determining the external humidity based on the internal temperature and the internal humidity.

23. The control method of claim 13, wherein obtaining the internal temperature and the internal humidity comprises:
    determining an internal absolute humidity based on a temperature and humidity obtained by an internal sensor, and
    determining an external absolute humidity based on a temperature and humidity obtained by an external sensor.

24. The control method of claim 13, wherein:
    the internal humidity corresponds to an absolute humidity inside of the chamber, and
    the external humidity corresponds to an absolute humidity outside of the clothes care apparatus.

* * * * *